US009493225B2

(12) United States Patent
Wang et al.

(10) Patent No.: US 9,493,225 B2
(45) Date of Patent: Nov. 15, 2016

(54) AERIAL VEHICLE WITH FRAME ASSEMBLIES

(71) Applicant: SZ DJI TECHNOLOGY Co., LTD, Shenzhen (CN)

(72) Inventors: Tao Wang, Shenzhen (CN); Tao Zhao, Shenzhen (CN); Hao Du, Shenzhen (CN); Mingxi Wang, Shenzhen (CN)

(73) Assignee: SZ DJI TECHNOLOGY Co., LTD, Shenzhen (CN)

(*) Notice: Subject to any disclaimer, the term of this patent is extended or adjusted under 35 U.S.C. 154(b) by 0 days.

(21) Appl. No.: 15/012,068

(22) Filed: Feb. 1, 2016

(65) Prior Publication Data
US 2016/0152316 A1 Jun. 2, 2016

Related U.S. Application Data

(63) Continuation of application No. 14/944,042, filed on Nov. 17, 2015, now Pat. No. 9,284,052, which is a continuation of application No. 14/639,550, filed on Mar. 5, 2015, now Pat. No. 9,242,729, which is a
(Continued)

(30) Foreign Application Priority Data

Jan. 10, 2013 (CN) .......................... 2013 1 0008317

(51) Int. Cl.
B64C 1/00 (2006.01)
B64C 1/06 (2006.01)
(Continued)

(52) U.S. Cl.
CPC ................ B64C 1/063 (2013.01); B64C 1/00 (2013.01); B64C 27/08 (2013.01); B64C 39/024 (2013.01);
(Continued)

(58) Field of Classification Search
CPC ........ B64D 47/08; A63H 27/12; B64C 1/28; B64C 2201/127; B64C 29/0025; B64C 29/0033
See application file for complete search history.

(56) References Cited

U.S. PATENT DOCUMENTS 1,919,121 A 7/1933 Etienne
1,950,915 A 3/1934 Lado-Bordowsky
(Continued)

FOREIGN PATENT DOCUMENTS

CN 1639500 A 7/2005
CN 102180267 A 9/2011
(Continued)

OTHER PUBLICATIONS

European search report and opinion dated May 13, 2015 for EP Application No. 13826711.7.
(Continued)

Primary Examiner — Philip J Bonzell
Assistant Examiner — Michael Kreiner
(74) Attorney, Agent, or Firm — Wilson Sonsini Goodrich & Rosati

(57) ABSTRACT

Systems, devices, and methods for a transformable aerial vehicle are provided. In one aspect, a transformable aerial vehicle includes: a central body and at least two transformable frames assemblies respectively disposed on the central body, each of the at least two transformable frame assemblies having a proximal portion pivotally coupled to the central body and a distal portion; an actuation assembly mounted on the central body and configured to pivot the at least two frame assemblies to a plurality of different vertical angles relative to the central body; and a plurality of propulsion units mounted on the at least two transformable frame assemblies and operable to move the transformable aerial vehicle.

23 Claims, 16 Drawing Sheets

Related U.S. Application Data continuation of application No. 14/565,119, filed on Dec. 9, 2014, now Pat. No. 9,242,714, which is a continuation of application No. 14/167,679, filed on Jan. 29, 2014, now Pat. No. 8,931,730, which is a continuation of application No. PCT/CN2013/090470, filed on Dec. 25, 2013.

(51) Int. Cl.

| | | |
|---|---|---|
| *B64C 39/02* | (2006.01) | |
| *B64C 27/08* | (2006.01) | |
| *G05D 1/04* | (2006.01) | |
| *B64D 47/00* | (2006.01) | |
| *B64D 47/08* | (2006.01) | |
| *A63H 27/00* | (2006.01) | |

(52) U.S. Cl.
CPC ............ *B64C 39/028* (2013.01); *B64D 47/00* (2013.01); *B64D 47/08* (2013.01); *G05D 1/042* (2013.01); *A63H 27/12* (2013.01); *B64C 2201/024* (2013.01); *B64C 2201/027* (2013.01); *B64C 2201/042* (2013.01); *B64C 2201/108* (2013.01); *B64C 2201/127* (2013.01); *B64C 2201/14* (2013.01); *B64C 2201/165* (2013.01)

(56) References Cited

U.S. PATENT DOCUMENTS

| | | | |
|---|---|---|---|
| 2,157,963 | A | 5/1939 | Mercier |
| 2,478,847 | A | 8/1949 | Stuart |
| 3,185,409 | A | 5/1965 | Jacobsen |
| 3,873,049 | A | 3/1975 | Horsdal |
| 3,889,902 | A | 6/1975 | Madet |
| 4,161,843 | A | 7/1979 | Hui |
| 4,591,112 | A | 5/1986 | Piasecki et al. |
| 6,655,631 | B2 | 12/2003 | Austen-Brown |
| 6,719,244 | B1 | 4/2004 | Gress |
| 6,978,969 | B1 | 12/2005 | Neal |
| 7,128,293 | B2 | 10/2006 | Isley |
| 7,364,114 | B2 | 4/2008 | Wobben |
| 7,699,260 | B2 | 4/2010 | Hughey |
| 7,959,104 | B2 | 6/2011 | Kuntz |
| 7,997,526 | B2 | 8/2011 | Greenley |
| 8,167,234 | B1 | 5/2012 | Moore |
| 8,172,173 | B2 | 5/2012 | Carlson |
| 8,187,049 | B2 | 5/2012 | Corsiglia et al. |
| 8,292,215 | B2 | 10/2012 | Olm et al. |
| 8,328,130 | B2 | 12/2012 | Goossen |
| 8,342,441 | B2 | 1/2013 | Yoeli |
| 8,453,962 | B2 | 6/2013 | Shaw |
| 8,602,348 | B2 | 12/2013 | Bryant |
| 8,646,720 | B2 | 2/2014 | Shaw |
| 8,931,730 | B2 | 1/2015 | Wang et al. |
| 9,242,714 | B2 | 1/2016 | Wang et al. |
| 9,242,729 | B1 | 1/2016 | Wang et al. |
| 9,284,052 | B1 | 3/2016 | Wang et al. |
| 2002/0104922 | A1 | 8/2002 | Nakamura |
| 2007/0158494 | A1 | 7/2007 | Burrage |
| 2010/0051740 | A1 | 3/2010 | Yoeli |
| 2011/0017865 | A1 | 1/2011 | Achtelik et al. |
| 2011/0315806 | A1 | 12/2011 | Piasecki et al. |
| 2012/0261523 | A1 | 10/2012 | Shaw |
| 2012/0273608 | A1 | 11/2012 | Jess et al. |
| 2012/0298793 | A1 | 11/2012 | Weddendorf et al. |
| 2013/0206915 | A1 | 8/2013 | Desaulniers |
| 2014/0034775 | A1 | 2/2014 | Hutson |
| 2014/0151496 | A1 | 6/2014 | Shaw |
| 2014/0263823 | A1 | 9/2014 | Wang et al. |
| 2015/0012154 | A1 | 1/2015 | Senkel et al. |
| 2015/0298788 | A1 | 10/2015 | Wang et al. |
| 2016/0023744 | A1 | 1/2016 | Wang et al. |
| 2016/0137298 | A1 | 5/2016 | Youngblood |

FOREIGN PATENT DOCUMENTS

| | | |
|---|---|---|
| CN | 102381471 A | 3/2012 |
| CN | 102490896 A | 6/2012 |
| CN | 101992854 B | 11/2012 |
| CN | 203047530 U | 7/2013 |
| CN | 203246584 U | 10/2013 |
| CN | 203306225 U | 11/2013 |
| CN | 103921933 A | 7/2014 |
| WO | WO 2009/095696 A2 | 8/2009 |
| WO | WO 2010/068194 A1 | 6/2010 |
| WO | WO 2011/131733 A2 | 10/2011 |

OTHER PUBLICATIONS

International search report and written opinion dated Mar. 2, 2015 for PCT/CN2014/080845.

International search report and written opinion dated Apr. 3, 2014 for PCT/CN2014/090470.

Notice of allowance dated Jan. 21, 2016 for U.S. Appl. No. 14/944,042.

Notice of allowance dated Sep. 25, 2015 for U.S. Appl. No. 14/565,119.

Notice of allowance dated Oct. 28, 2014 for U.S. Appl. No. 14/167,679.

Notice of allowance dated Oct. 28, 2015 for U.S. Appl. No. 14/639,550.

Notice of allowance dated Nov. 21, 2014 for U.S. Appl. No. 14/167,679.

Office action dated Jun. 25, 2014 for U.S. Appl. No. 14/167,679.
Office action dated Jul. 28, 2015 for U.S. Appl. No. 14/639,550.

AERIAL VEHICLE WITH FRAME ASSEMBLIES

CROSS-REFERENCE

This application is a continuation of U.S. patent application Ser. No. 14/944,042, filed Nov. 17, 2015, now U.S. Pat. No. 9,284,052, issued on Mar. 15, 2016, which is a continuation of U.S. patent application Ser. No. 14/639,550, filed on Mar. 5, 2015, now U.S. Pat. No. 9,242,729, issued on Jan. 26, 2016, which is a continuation of U.S. patent application Ser. No. 14/565,119, filed on Dec. 9, 2014, now U.S. Pat. No. 9,242,714, issued on Jan. 26, 2016, which is a continuation of U.S. patent application Ser. No. 14/167,679, filed on Jan. 29, 2014, now U.S. Pat. No. 8,931,730, issued on Jan. 13, 2015, which is a continuation of International Application No. PCT/CN2013/090470, filed Dec. 25, 2013, which claims the benefit of Chinese Patent Application No. 201310008317.5, filed Jan. 10, 2013, the disclosures of which are hereby incorporated by reference in their entirety.

BACKGROUND

Unmanned vehicles can be used for performing surveillance, reconnaissance, and exploration tasks for military and civilian applications. Unmanned vehicles may be outfitted with a functional payload, such as sensors for collecting data from the surrounding environment. For example, remote-controlled unmanned aerial vehicles, which include fixed-wing aircraft and rotary-wing aircraft, can be used to provide aerial imagery of otherwise inaccessible environments.

The design of such unmanned vehicles involves tradeoffs between vehicle size, weight, payload capacity, energy consumption, and cost. Additionally, the vehicle design should provide sufficient functional space for the payload to operate. In some instances, existing unmanned aerial vehicle designs can be less than ideal for providing unobstructed viewing angles for a payload camera, such as when the visual space is obscured by the vehicle frame.

SUMMARY

A need exists for improvements in the structure and design of vehicles such as unmanned aerial vehicles. The present invention provides systems, devices and methods for a transformable aerial vehicle. In some embodiments, the systems, devices and methods described herein provide an aerial vehicle capable of transforming from a first configuration to a second configuration in order to increase the functional space of a coupled payload. Advantageously, the disclosed systems, devices and methods obviate the need for increasing the size of the aerial vehicle or providing additional mounting structures for the payload to increase the payload functional space.

In one aspect of the present disclosure, a transformable aerial vehicle is described. The transformable aerial vehicle includes: a central body; at least two transformable frame assemblies respectively disposed on the central body, each of the at least two transformable frame assemblies having a proximal portion pivotally coupled to the central body and a distal portion; an actuation assembly mounted on the central body and configured to pivot the at least two transformable frame assemblies to a plurality of different vertical angles relative to the central body; and a plurality of propulsion units mounted on the at least two transformable frame assemblies and operable to move the transformable aerial vehicle.

In another aspect of the present disclosure, a transformable aerial vehicle is described. The transformable aerial vehicle includes: a central body; at least two transformable frame assemblies respectively disposed on the central body, each of the at least two transformable frame assemblies having a proximal portion coupled to the central body and a distal portion; an actuation assembly configured to transform the at least two transformable frame assemblies between a first configuration and a second configuration; and a plurality of propulsion units mounted on the at least two transformable frame assemblies and operable to move the transformable aerial vehicle, wherein the first configuration includes the propulsion units being positioned above the central body and the second configuration includes the propulsion units being positioned below the central body.

In another aspect of the present disclosure, a transformable aerial vehicle is described. The transformable aerial vehicle includes: a central body coupled to a payload; at least two transformable frame assemblies respectively disposed on the central body, each of the at least two transformable frame assemblies having a proximal portion coupled to the central body and a distal portion; an actuation assembly mounted on the central body and configured to transform the at least two transformable frame assemblies between a first configuration and a second configuration, wherein the first configuration permits the at least two transformable frame assemblies to support the transformable aerial vehicle resting on a surface, and wherein the second configuration increases a functional space of the payload; and a plurality of propulsion units mounted on the at least two transformable frame assemblies and operable to move the transformable aerial vehicle.

In some embodiments, the transformable aerial vehicle in an unmanned aerial vehicle.

In some embodiments, the at least two transformable frame assemblies include a primary shaft and at least one secondary shaft extending parallel to the primary shaft, the primary shaft and the at least one secondary shaft respectively pivotally coupled to the central body, wherein the primary shaft and the at least one secondary shaft are coupled to each other such that actuation of the primary shaft by the actuation assembly produces a corresponding actuation of the at least one secondary shaft.

In some embodiments, the actuation assembly includes a linear actuator, and a portion of each of the at least two transformable frame assemblies is coupled to the linear actuator. The linear actuator can include a screw and nut mechanism, and the portion of each of the at least two transformable frame assemblies can be coupled to the nut.

In some embodiments, each of the plurality of propulsion units includes a rotor. The rotor can be oriented horizontally relative to the transformable aerial vehicle.

In some embodiments, the transformable aerial vehicle further includes a receiver, the receiver configured to receive user commands for controlling one or more of the actuation assembly and the plurality of propulsion units. The user commands can be transmitted from a remote terminal.

In some embodiments, the transformable aerial vehicle further includes a payload coupled to the central body. The payload can include an image capturing device.

In some embodiments, the actuation assembly is configured to pivot the at least two transformable frame assemblies between a first vertical angle and a second vertical angle. At the first vertical angle, the at least two transformable frame assemblies may be angled downwards relative to the central body, and at the second vertical angle, the at least two transformable frame assemblies may be angled upwards relative to the central body.

In some embodiments, the at least two transformable frame assemblies are transformed into the first configuration during a first phase of operation of the transformable aerial vehicle and transformed into the second configuration during a second phase of operation of the transformable aerial vehicle. The first phase of operation may include the transformable aerial vehicle flying in air, and the second phase of operation may include the transformable aerial vehicle taking off from a surface and/or landing on the surface.

In some embodiments, the payload includes an image capturing device, and the functional space includes an unobstructed field of view of the image capturing device.

In some embodiments, the at least two transformable frame assemblies each include a support member configured to support the transformable aerial vehicle resting on a surface.

In some embodiments, in the first configuration, the at least two transformable frame assemblies are angled downwards relative to the central body, and in the second configuration angle, the at least two transformable frame assemblies are angled upwards relative to the central body.

In another aspect, a method for controlling a transformable aerial vehicle is provided. The method includes: providing the aforementioned transformable aerial vehicle; and driving the actuation assembly mounted on the central body to pivot the at least two transformable frame assemblies to a plurality of different vertical angles relative to the central body.

In another aspect, a method for controlling a transformable aerial vehicle is provided. The method includes: providing the aforementioned transformable aerial vehicle; and driving the actuation assembly mounted on the central body to transform the at least two transformable frame assemblies between the first configuration and the second configuration.

It shall be understood that different aspects of the invention can be appreciated individually, collectively, or in combination with each other. Various aspects of the invention described herein may be applied to any of the particular applications set forth below or for any other types of movable objects. Although the systems, devices, and methods described herein are generally presented in the context of aerial vehicles, this is not intended to be limiting, as the following embodiments can be applied to any suitable movable object. Any description herein of an aerial vehicle may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

The present invention provides systems, devices and methods for a transformable aerial vehicle. The systems, devices, and methods described herein can be used to transform an aerial vehicle between a plurality of different configurations. Each configuration can be optimized for a specified function of the aerial vehicle. For example, a configuration may provide increased functional space for a payload coupled to the aerial vehicle, such as an increased field of view for a camera mounted onto the aerial vehicle. When desired, a configuration may provide support for the aerial vehicle when resting on a surface, such as by means of support members configured to raise the body of the aerial vehicle off the ground.

In one aspect, the present invention provides a transformable aerial vehicle having one or more of the unique features disclosed below. In one embodiment, a transformable aerial vehicle comprises: a central body; at least two transformable frame assemblies respectively disposed on the central body, each of the at least two transformable frame assemblies having a proximal portion pivotally coupled to the central body and a distal portion; an actuation assembly mounted on the central body and configured to pivot the at least two transformable frame assemblies to a plurality of different vertical angles relative to the central body; and a plurality of propulsion units mounted on the at least two transformable frame assemblies and operable to move the transformable aerial vehicle.

A transformable aerial vehicle of the present invention can include a central body and at least two transformable frame assemblies disposed respectively on the central body. A plurality of propulsion units can be mounted on the transformable frame assemblies and coupled thereby to the central body. The propulsion units can be used to enable the transformable aerial vehicle to take off, land, hover, and move in the air with respective to up to three degrees of freedom of translation and up to three degrees of freedom of rotation. The propulsion units can be mounted on any suitable portion of the transformable frame assemblies, such as at or near the distal portions of the transformable frame assemblies.

Figure 4:
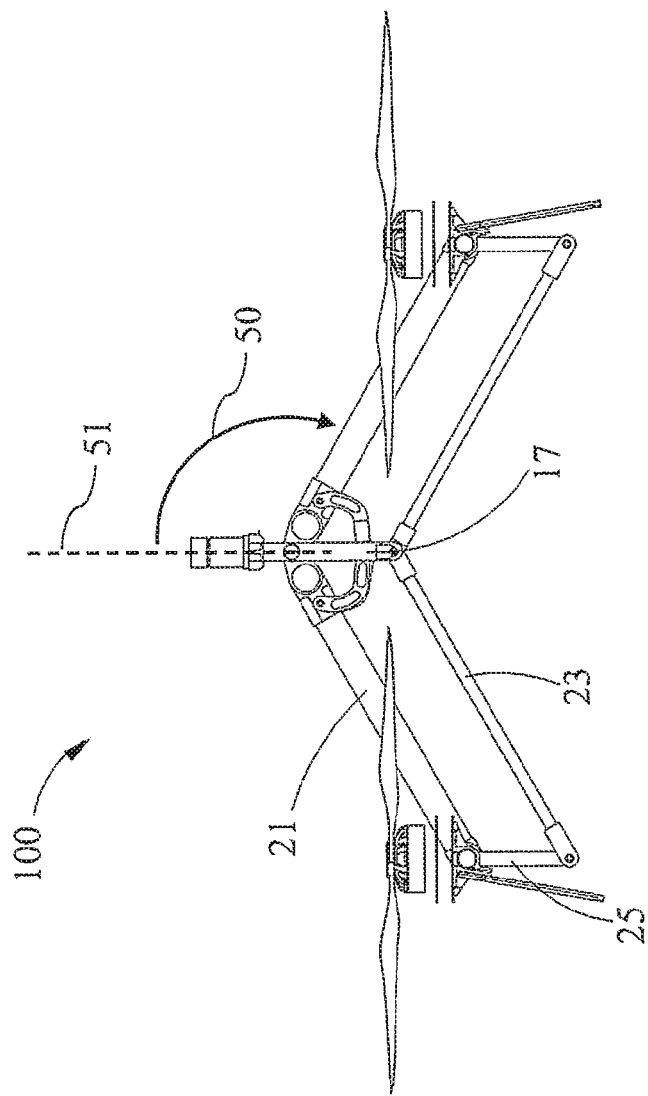
FIG. 4 is a side view of the transformable unmanned aerial vehicle of FIG. 1 in a landing configuration, in accordance with embodiments.
Figure 5:
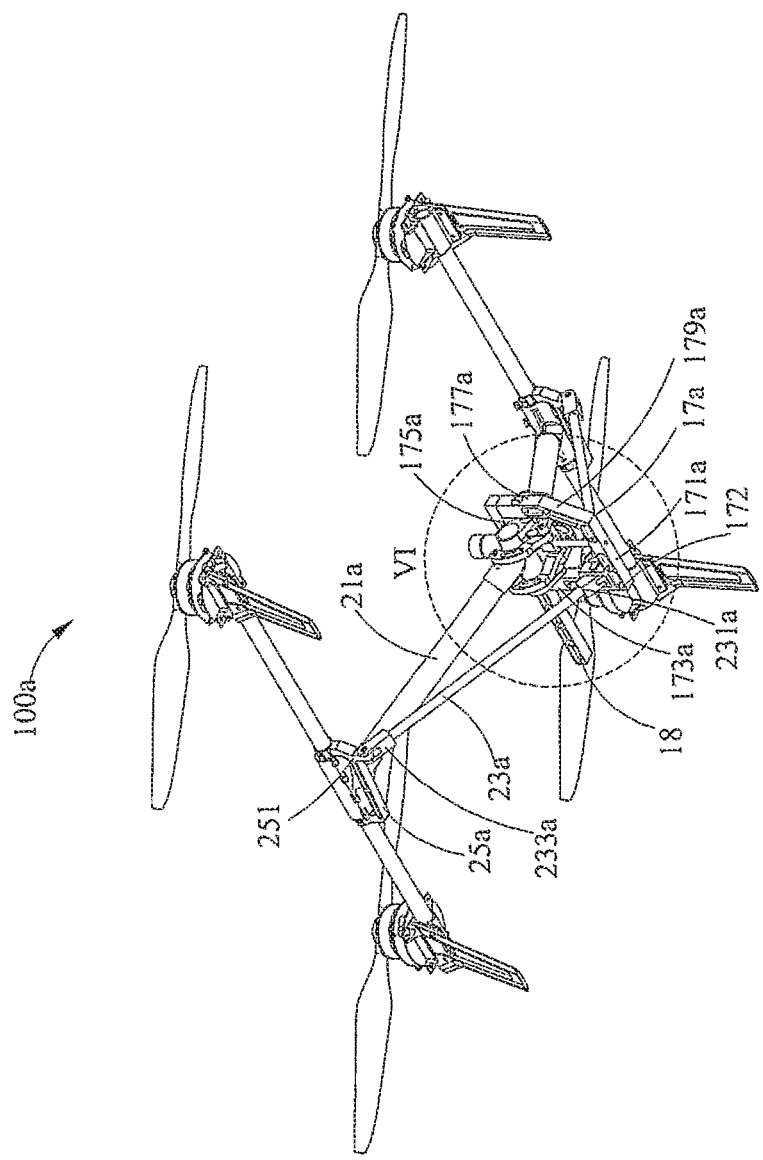
FIG. 5 illustrates another example of a transformable unmanned aerial vehicle in a flight configuration, in accordance with embodiments.

The proximal portions of the transformable frame assemblies can be pivotally coupled to the central body, thus enabling the transformable frame assemblies to transform by pivoting relative to the central body. For example, in some embodiments, the transformable frame assemblies can be pivoted through a plurality of vertical angles relative to the central body (e.g., a vertical angle 50 measured from the line 51, as depicted in FIG. 4). The transformation of the transformable frame assemblies can be actuated by a suitable actuation assembly mounted on the central body and coupled to the transformable frame assemblies. Advantageously, this approach allows the vertical angle of the transformable frame assemblies to be adjusted as needed during operation of the transformable aerial vehicle.

In another embodiment, the present invention provides an alternative transformable aerial vehicle having the following features. The transformable aerial vehicle comprises: a central body coupled to a payload; at least two transformable frame assemblies respectively disposed on the central body, each of the at least two transformable frame assemblies having a proximal portion pivotally coupled to the central body and a distal portion; an actuation assembly mounted on the central body and configured to pivot the at least two transformable frame assemblies between a first configuration and a second configuration, wherein the first configuration permits the at least two transformable frame assemblies to support the transformable aerial vehicle resting on a surface, and wherein the second configuration increases a functional space of the payload; and a plurality of propulsion units mounted on the at least two transformable frame assemblies and operable to move the transformable aerial vehicle.

The central body, transformable frame assemblies, propulsion units, and actuation assembly disclosed above are equally applicable to this embodiment. Where desired, such transformable frame assemblies can be modified to be transformable to a first configuration supporting the transformable aerial vehicle resting on a surface (e.g., the ground). For example, the transformable frame assemblies can include a plurality of support members suitable for supporting the transformable aerial vehicle such that the central body does not contact the surface.

In some instances, however, an alternative configuration may be more useful. For example, the central body of the transformable aerial vehicle can be modified to mount a payload. The payload can be coupled to any suitable portion of the central body, such as on top, underneath, on the front, on the back, or on the sides of the central body. The payload can be configured to perform a function or operation. The function or operation of the payload may require a certain amount of functional space. The functional space can be, for example, a space occupied, affected, manipulated, or otherwise used by the payload during its operation. In some instances, however, the functional space may be obstructed by a portion of the transformable aerial vehicle. For example, when in the first configuration, the transformable frame assemblies may extend into the functional space, thereby interfering with the operation of the payload.

Accordingly, the transformable frame assemblies can be modified to be transformable to a second configuration increasing the functional space of a coupled payload, thus enabling or enhancing the ability of the payload to perform its function. Furthermore, the actuation assembly can be modified to transform the transformable frame assemblies between the first and second configurations, thereby allowing the structure of the transformable aerial vehicle to be optimized for multiple functionalities.

In another embodiment, the present invention provides another alternative transformable aerial vehicle having the following features. The transformable aerial vehicle comprises: a central body coupled to a payload; at least two transformable frame assemblies respectively disposed on the central body, each of the at least two transformable frame assemblies having a proximal portion pivotally coupled to the central body and a distal portion; an actuation assembly mounted on the central body and configured to pivot the at least two transformable frame assemblies between a first configuration and a second configuration; and a plurality of propulsion units mounted on the at least two transformable frame assemblies and operable to move the transformable aerial vehicle, wherein the first configuration includes the propulsion units being positioned above the central body and the second configuration includes the propulsion units being positioned below the central body.

The central body, transformable frame assemblies, propulsion units, and actuation assembly disclosed above are equally applicable to this embodiment. Where desired, the transformable frame assemblies can be modified to be transformable between a first configuration and a second configuration, such that the propulsion units are positioned above the central body in the first configuration and below the central body in the second configuration. Advantageously, this approach allows the height of the propulsion units to be adjusted as needed during operation of the transformable aerial vehicle.

In a separate aspect, the present invention provides a method for controlling a transformable aerial vehicle. In one embodiment, the method comprises providing a transformable aerial vehicle, the transformable aerial vehicle comprising: a central body; at least two transformable frame assemblies respectively disposed on the central body, each of the at least two transformable frame assemblies having a proximal portion pivotally coupled to the central body and a distal portion; an actuation assembly mounted on the central body and configured to pivot the at least two transformable frame assemblies to a plurality of different vertical angles relative to the central body; and a plurality of propulsion units mounted on the at least two transformable frame assemblies and operable to move the transformable aerial vehicle. The method comprises driving the actuation assembly mounted on the central body to pivot the at least two transformable frame assemblies to a plurality of different vertical angles relative to the central body.

A method of controlling a transformable aerial vehicle can include providing a transformable aerial vehicle having transformable frame assemblies pivotally coupled to a central body and transformable between a plurality of different vertical angles, as described above. The method can include driving the actuation assembly with a suitable drive unit (e.g., a motor or engine) to transform the transformable frame assemblies between the plurality of different vertical angles. The driving of the actuation assembly can occur automatically (e.g., based on a state of the transformable aerial vehicle, such as the altitude, longitude, or latitude) or in response to a user command. The method can be applied, for example, to adjust the vertical angle of the transformable frame assemblies during the operation of the transformable aerial vehicle.

In another embodiment, the present invention provides an alternative method for controlling a transformable aerial vehicle having the following steps. The method comprises providing a transformable aerial vehicle, the transformable aerial vehicle comprising: a central body coupled to a payload; at least two transformable frame assemblies respectively disposed on the central body, each of the at least two transformable frame assemblies having a proximal portion pivotally coupled to the central body and a distal portion; an actuation assembly mounted on the central body and configured to pivot the at least two transformable frame assemblies between a first configuration and a second configuration, wherein the first configuration permits the at least two transformable frame assemblies to support the transformable aerial vehicle resting on a surface, and wherein the second configuration increases a functional space of the payload; and a plurality of propulsion units mounted on the at least two transformable frame assemblies and operable to move the transformable aerial vehicle. The method comprises driving the actuation assembly mounted on the central body to transform the at least two transformable frame assemblies between the first configuration and the second configuration.

A method of controlling a transformable aerial vehicle can include providing a transformable aerial vehicle having transformable frame assemblies transformable between a first configuration supporting the transformable aerial vehicle on a surface and a second configuration increasing the functional space of a payload, as disclosed above. The method can include driving the actuation assembly with a suitable drive unit to transform the transformable frame assemblies between the first and second configurations. For example, the actuation assembly can be driven to transform the transformable frame assemblies to the first configuration when the transformable aerial vehicle is taking off from a surface or landing on a surface. The actuation assembly can drive the transformation to the second configuration when the transformable aerial vehicle is in a state suitable for operating the payload, such as during flight.

In another embodiment, the present invention provides another alternative method for controlling a transformable aerial vehicle having the following steps. The method comprises providing a transformable aerial vehicle comprising: a central body coupled to a payload; at least two transformable frame assemblies respectively disposed on the central body, each of the at least two transformable frame assemblies having a proximal portion pivotally coupled to the central body and a distal portion; an actuation assembly mounted on the central body and configured to pivot the at least two transformable frame assemblies between a first configuration and a second configuration; and a plurality of propulsion units mounted on the at least two transformable frame assemblies and operable to move the transformable aerial vehicle, wherein the first configuration includes the propulsion units being positioned above the central body and the second configuration includes the propulsion units being positioned below the central body. The method comprises driving the actuation assembly mounted on the central body to transform the at least two transformable frame assemblies between the first configuration and the second configuration.

A method of controlling a transformable aerial vehicle can include providing a transformable aerial vehicle having transformable frame assemblies transformable between a first configuration, in which the propulsion units are positioned above the central body, and a second configuration, in which the propulsion units are positioned below the central body, as described above. The method can include driving the actuation assembly with a suitable drive unit to transform the transformable frame assemblies between the first and second configurations. As previously described, the driving of the actuation assembly can occur automatically or in response to a user command. The method can be applied, for example, to adjust the height of the propulsion units during the operation of the transformable aerial vehicle.

Referring now to FIGS. 1-4, a transformable unmanned aerial vehicle (UAV) 100 can include a central body 10 and transformable frame assemblies 20 disposed respectively on the central body 10. A plurality of propulsion units 30 are mounted respectively on the transformable frame assemblies 20. The terms "propulsion support frames," "propulsion support assemblies," "transformable assemblies," and "transformable structures," may also be used to refer to the transformable frame assemblies 20.

The central body 10 of the UAV 100 can be used to support a load, such as a carrier and/or payload as described in further detail elsewhere herein. The load can be coupled to any suitable portion of the central body 10, such as the bottom or underside of the central body 10. The coupling can be a rigid coupling, or it can permit motion of the load with respect to the central body.

The coupled load can be a payload configured to perform a function, such as a sensor, emitter, tool, instrument, manipulator, or any other functional device. For example, the payload may be an image capturing device. In some instances, the image capturing device may be a camera pointing downwards relative to the central body 10. The camera can be configured to rotate relative to the central body 10 (e.g., via a carrier or other mounting platform) in order to capture images from a plurality of viewing angles. Any description herein of a camera payload can be applied to other types of payload devices.

The payload can be associated with a functional space. The functional space can be a space occupied, affected, manipulated, or otherwise used by the payload during its operation, as previously described herein. For example, the functional space of a sensor can be the space from which the sensor can collect data. In some instances, the functional space of a camera or other image capture device can be an unobstructed field of view or viewing angles of the camera. For a tool, instrument or manipulator mechanism, the functional space can be an unobstructed working range or movement range. For example, a functional space of an emitter (e.g., illumination source) may be an unobstructed area which may receive emissions (e.g., illumination) from the emitter. The functional space of a payload can be of a fixed size or a variable size. In some embodiments, the functional space can be increased or decreased. For example, the functional space may be increased or decreased by a transformation of the UAV 100, as described in further detail below.

The propulsion units 30 can be used to enable the UAV 100 to take off, land, hover, and move in the air with respective to up to three degrees of freedom of translation and up to three degrees of freedom of rotation. In some embodiments, the propulsion units 30 can include one or more rotors. The rotors can include one or more rotor blades coupled to a shaft. The rotor blades and shaft can be driven to rotate by a suitable drive mechanism, such as a motor. Although the propulsion units 30 of the unmanned aerial vehicle 100 are depicted as four rotors, any suitable number, type, and/or arrangement of propulsion units can be used. For example, the number of rotors may be one, two, three, four, five, six, seven, eight, or more. The rotors may be oriented vertically, horizontally, or at any other suitable angle with respect to the UAV 100. The angle of the rotors may be fixed or variable. The distance between shafts of opposite rotors can be any suitable distance, such as less than or equal to 2 m, less than equal to 5 m. Optionally, the distance can be within a range from 40 cm to 1 m, from 10 cm to 2 m, or from 5 cm to 5 m. The propulsion units 30 can be driven by any suitable motor, such as a DC motor (e.g., brushed or brushless) or an AC motor. In some embodiments, the motor can be adapted to mount and drive a rotor blade.

The transformable frame assemblies 20 can be used to couple the propulsion units 30 to the central body 10. The proximal portion of each transformable frame assembly 20 can be coupled to the central body 10, and the propulsion units 30 can be mounted on any suitable portion of the transformable frame assemblies 20, such as at or near the distal portions of the transformable frame assemblies 20. Alternatively, the propulsion units 30 can be mounted at or near the proximal end. The propulsion units 30 can be mounted at or near a point within about $\frac{1}{10}$, $\frac{1}{5}$, $\frac{1}{4}$, $\frac{1}{3}$, $\frac{1}{2}$, $\frac{3}{4}$, $\frac{2}{3}$, $\frac{4}{5}$, or $\frac{9}{10}$ along the length of the transformable frame assembly 20 as measured from the distal end. The UAV 100 can include any suitable number of transformable frame assemblies 20, such as one, two, three, four, or more. In some embodiments, the UAV 100 includes at least two transformable frame assemblies 20. The transformable frame assemblies 20 can be situated symmetrically or asymmetrically around the central body 10. Each transformable frame assembly 20 can be used to support a single propulsion unit, or multiple propulsion units. The propulsion units 30 can be evenly distributed among the transformable frame assemblies 20. Alternatively, each transformable frame assembly 20 can have a different number of propulsion units 30.

In some embodiments, the transformable frame assemblies 20 can support the propulsion units using via a cross bar or other similar support structure. For example, a transformable frame assembly 20 can include a cross bar located at the distal end or near the distal end of the transformable frame assembly 20. The cross bar may be arranged at a suitable angle relative to the transformable frame assembly 20, such as extending perpendicular or approximately perpendicular to the transformable frames assembly 20. The cross bar can be coupled to the transformable frame assembly 20 via any suitable portion of the cross bar, such as at or near the midpoint of the cross bar. The cross bar can be configured to support a plurality of propulsion units 30 (e.g., one, two, three, four, or more). The propulsion units 30 may be mounted onto any suitable portion of the cross bar. For example, the propulsion units 30 may be disposed on or near each of the ends of the cross bar. The propulsion units 30 may be distributed symmetrically on the cross bar, such as with one propulsion unit at each end of the cross bar. Alternatively, the propulsion units 30 may be distributed asymmetrically on the cross bar.

Optionally, one or more of the transformable frame assemblies 20 can include a support member 40. The support member 40 can be a linear, curved, or curvilinear structure. In some instances, each of the transformable frame assemblies 20 has a corresponding support member 40. The support member 40 can be used to support the UAV 10 on a surface (e.g., before takeoff or after takeoff). For example, each support member 40 can contact the surface at one, two, three, four, or more points of contact. Optionally, the support member 40 is configured to support the UAV 100 on a surface upon landing or before takeoff such that the other portions of the transformable frame assemblies 20 and the central body 10 do not touch the surface. The support member 40 can be situated at any suitable of the transformable frame assemblies 20, such as at or near the distal end or the proximal end. The support member 40 can be mounted at or near a point within about $\frac{1}{10}$, $\frac{1}{5}$, $\frac{1}{4}$, $\frac{1}{3}$, $\frac{1}{2}$, $\frac{3}{4}$, $\frac{2}{3}$, $\frac{4}{5}$, or $\frac{9}{10}$ along the length of the transformable frame assembly 20 as measured from the distal end. In some embodiments, the support member 40 can be situated on the transformable frame assembly 20 near the propulsion unit 30, such as under the propulsion unit 30. The support member 40 may be coupled to the propulsion unit 30. The support member 40 may be static. Alternatively, the support member 40 may be movable relative the transformable frame assembly 20, such as by sliding, rotating, telescoping, folding, pivoting, extending, shrinking, and the like.

The transformable frame assemblies 20 can be configured to transform between a plurality of different configurations, such as between two, three, four, five, six, or more. The UAV 100 can be designed to transform between the plurality of different configurations in a fixed sequence. Alternatively, the UAV 100 may be able to transform between the plurality of different configurations in any order. Transforming from a first configuration to a second configuration may involve transforming through a plurality of intermediate or transitional configurations. The UAV 100 may be able to stop the transformation at an intermediate configuration, or may be able to stop the transformation only once the end configuration has been reached. A configuration can be maintained by the UAV 100 indefinitely, or only for a set amount of time. Some configurations may only be usable during certain phases of operation of the UAV 100 (e.g., when the UAV 100 is on the ground, during takeoff, during landing, or during flight). Alternatively, some configurations may be usable during any phase of operation. For example, it may be optimal for the transformable frame assemblies 20 to assume a first configuration during a first phase of operation (e.g., a landing configuration before takeoff and/or after landing) and a second configuration during a second phase of operation (e.g., a flight configuration during flight). Any number of configurations can be used during operation of the UAV 100.

In some embodiments, each of the plurality of configurations provides a different functionality to the UAV 100. For example, a first configuration can enable the UAV 100 to be supported on a surface by the support members 40. In some instances, the first configuration may be a landing or surface-contacting configuration in which the UAV 100 may be supported on a surface with a payload or central body 10 not contacting the surface. A second configuration can increase a functional space of a payload coupled to the central body 10. For example, the second configuration may be a flight configuration that reduces interference of one or more components of the UAV 100 with the functioning of the payload. The transformation of the UAV 100 to the second configuration can be used to move the transformable frame assemblies 20 out of the field of view of a payload camera in order to provide an unobstructed viewing angle (e.g., a 360° viewing angle) or increase a field of view. In another example, transformation of the UAV 100 to a second configuration may include moving the transformable frame assemblies 20 so they do not obstruct one or more types of sensors or emitters, or reduce interference with one or more types of sensors or emitters. Alternatively or in combination, the transformation to the second configuration can increase the available maneuvering space for a robotic arm coupled to the underside of the central body 10. The functional space may be increased by a transformation achieving one or more of: removing an obstruction from the functional space, changing a shape of the functional space, changing a shape of a portion of the UAV 100, or changing the position and/or orientation of the payload. In some instances, the functional space of the payload may be at least partially obstructed by the UAV 100 (e.g., by the transformable frame assemblies 20) in the first configuration, and the obstruction can be removed by transforming to the second configuration.

The transformation of the transformable frame assemblies 20 can involve a motion of one or more portions of the transformable frame assemblies 20, such as translating, rotating, folding, unfolding, telescoping, extending, or shrinking motions. The transformation can include a single type of motion, or a plurality of different type of motions. The transformable frame assemblies 20 may be mutually coupled such that they are transformed simultaneously, or they may be configured to be transformed independently. A transformation can involve transforming all of the transformable frame assemblies 20 or only some of the transformable frame assemblies 20.

In some embodiments, the transformable frame assemblies 20 are pivotally coupled to the central body 10, thereby enabling the transformable frame assemblies 20 to transform by rotation (about to up to three axes of rotation) relative to the central body 10. For example, the transformable frame assemblies 20 can be pivoted through a plurality of vertical angles relative to the central body 10. A vertical angle can be defined as an angle 50 formed by a portion of the transformable frame assembly 20 as measured from the line 51, as depicted in FIG. 4. The transformable frame assemblies 20 can be pivoted to a vertical angle less than 90° such that the distal portions are approximately positioned above the central body 10 (hereinafter "upwards," e.g., FIG. 1). In some instances, the transformable frame assemblies 20 can be pivoted to a vertical angle greater than 90° such that the distal portions are approximately positioned below the central body 10 (hereinafter "downwards," e.g., FIGS. 3 and 4). The transformable frame assemblies 20 can be pivoted to a vertical angle of 90° such that the distal portions are approximately even with the central body 10. Above, below, and even with the central body 10 can be defined as above, below, or even with the vertical center of mass of the central body 10 or the vertical midpoint of the central body 10 (e.g., along line 51). The vertical angles through which the transformable frame assemblies 20 can be pivoted can be within a range from 0° to 180°, 0° to 90°, 90° to 180°, 15° to 165°, 20° to 160°, 30° to 150°, or 45° to 135°. The transformable frame assemblies 20 may be capable of being transformed to any vertical angle within the range, or only to certain vertical angles within the range. The vertical angles can include a vertical angle permitting the transformable frame assemblies 20 to support the UAV 100 resting on a surface, and/or a vertical angle increasing a functional space of a coupled payload, as previously described herein.

In some instances, the position of the distal portions (e.g., above, below, or even with the central body 10) can be varied through different configurations, potentially independently of the vertical angle of the transformable frame assemblies 20 as described above, such that the distal portions can be situated in any configuration relative to the central body 10. For example, the distal portions can be positioned approximately above the central body 10 in a first configuration and positioned approximately below the central body 10 in a second configuration. This may be independent of the vertical angle of the transformable frame assemblies 20. Conversely, the transformable frame assemblies 20 can be pivoted to a vertical angle less than 90° in a first configuration and to a vertical angle greater than 90° in a second configuration. In such arrangements, the distal portions of the transformable frame assemblies 20 may be positioned above, below, even with, or any combination thereof relative to the central body 10. In some instances, transforming from a first configuration to a second configuration may cause the distal portions of the transformable frame assemblies 20 to be positioned higher with respect to the central body 10, while the vertical angle of the transformable frame assemblies 20 as measured from the line 51 may be increased. Conversely, transforming from a first configuration to a second configuration may cause the distal portions of the transformable frame assemblies 20 to be positioned lower with respect to the central body 10, while the vertical angle of the transformable frame assemblies 20 as measured from the line 51 may be decreased.

Furthermore, the transformable frame assemblies 20 can be configured to transform by translating (along up to three axes of translation), folding, unfolding, telescoping, extending, or shrinking, relative to the central body 10. For example, the transformable frame assemblies 20 may be configured to slide upwards or downwards, or inward or outwards, relative to the central body 10. In some instances, the transformable frame assemblies 20 may include one or more telescoping elements that can be extended or retracted in order to extend or shrink the length, width, and/or height of one or more portions of the transformable frame assemblies 20. As described above, the transformations of the transformable frame assemblies 20 may occur completely independently from each other. Alternatively, one or more transformations may be coupled, such that one transformation produces a corresponding second transformation.

In some embodiments, one or more portions of the transformable frame assemblies 20 can be transformed independently from other portions of the transformable frame assemblies 20. For example, the distal portions may be transformed independently of the proximal portions, and vice-versa. Different types of transformations (e.g., rotating, translating, folding, unfolding, telescoping, extending, or shrinking) can be applied to different portions of the transformable frame assemblies 20. The different portions of the transformable frame assemblies 20 may be transformed simultaneously or sequentially. Certain configurations may require transforming all portions of the transformable frame assemblies 20. Alternatively, certain configurations may require transforming only some of the portions of the transformable frame assemblies 20.

The transformation of the UAV 100 can be controlled by a suitable control system (e.g., the system 300) mounted on the UAV 100 (e.g., on the central body 10). In some embodiments, the control system can be configured to automatically control the transformation of the UAV 100, based on one or more of: position of the UAV, orientation of UAV, current configuration of the UAV, time, or sensing data acquired by a sensor of the UAV or by the payload. For example, the UAV 100 can include one or more sensors adapted to sense when the UAV 100 is about to land (e.g., based on position, velocity, and/or acceleration data), and the control system can automatically transform the UAV 100 into a landing configuration. Similarly, the UAV 100 can include one or more sensors adapted to sense when the UAV 100 is at a suitable altitude for aerial photography, and the control system can automatically transform the UAV 100 into a flight configuration increasing the functional space of a camera payload, as described herein.

Alternatively or in combination, the control system can include a receiver or other communication module mounted on the UAV 100 for receiving user commands, such as from a remote terminal as described elsewhere herein. The user commands received by the receiver can be used to control an actuation assembly configured to actuate the transformable frame assemblies 20 (e.g., via control of a suitable drive unit, such as the drive unit 11 described in further detail below). For example, the commands can include commands to turn the drive unit on or off, drive the actuation assembly with the drive unit (e.g., in a clockwise or counterclockwise rotation), or maintain a current state of the actuation assembly. The commands can result in the UAV 100 transforming to a specified configuration or maintaining a current configuration. In some embodiments, the transformation of the UAV 100 can be indirectly triggered by a user command directed to another function of the UAV. For example, a user command for the UAV 100 to land may automatically cause the UAV 100 to transform into a landing configuration. Optionally, a user command for a camera payload to begin recording images may automatically cause the UAV 100 to transform a configuration increasing the functional space of the camera, as described herein.

Figure 1:
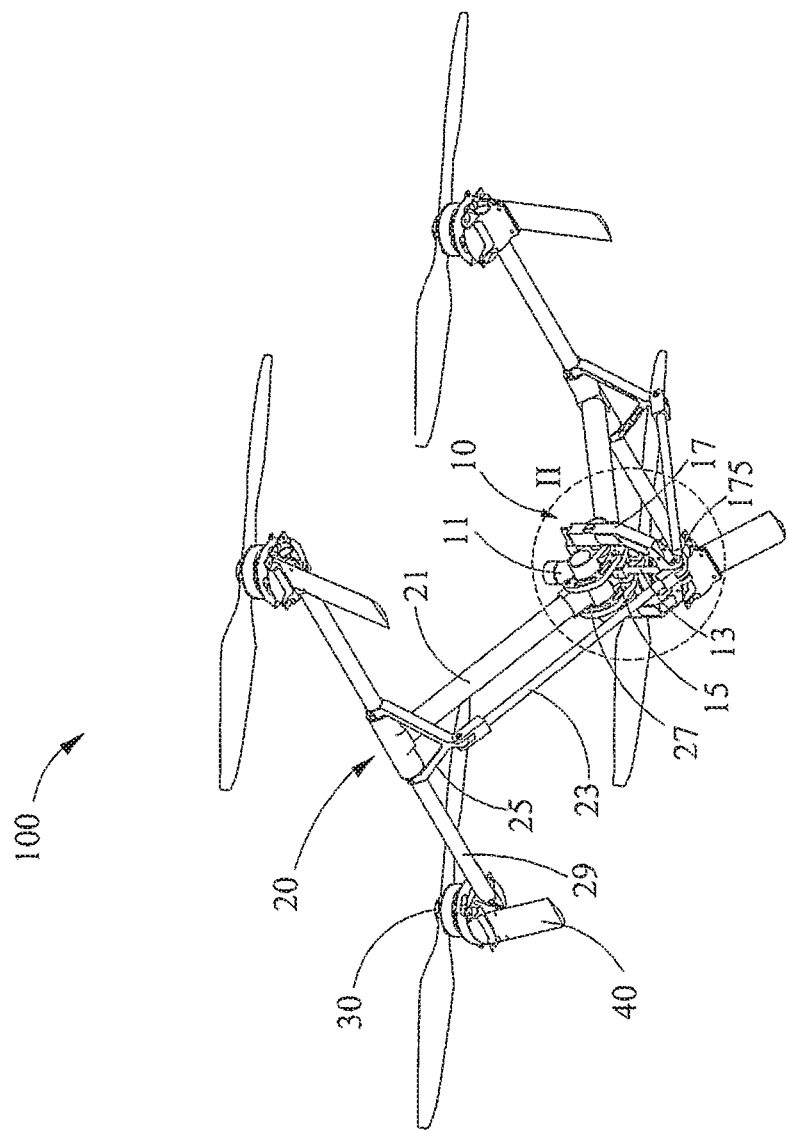
FIG. 1 illustrates a transformable unmanned aerial vehicle in a flight configuration, in accordance with embodiments.
Figure 2:
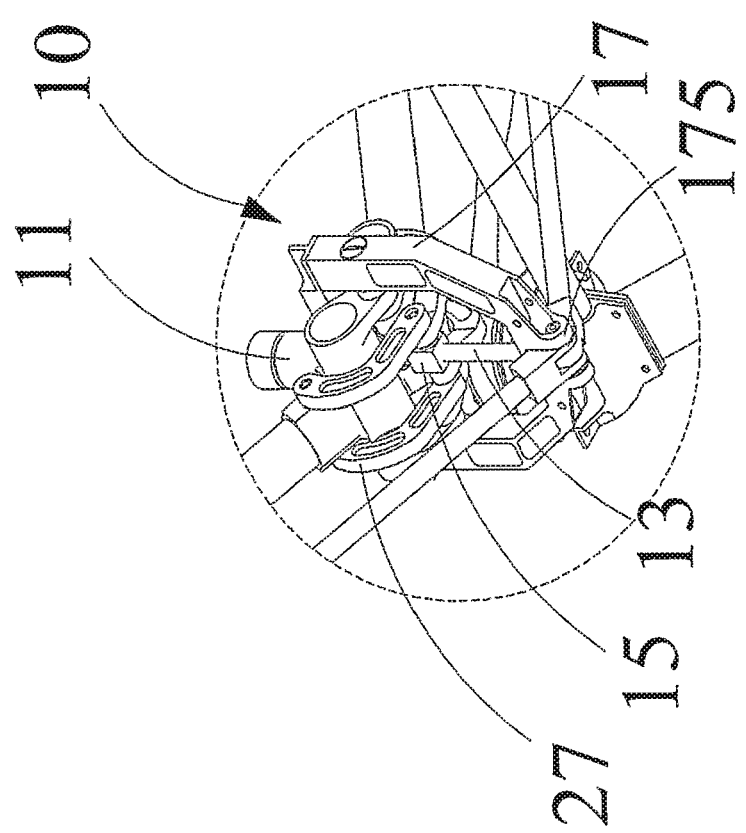
FIG. 2 is a closer view of the region II of FIG. 1, in accordance with embodiments.

The UAV 100 can utilize any configuration of the transformable frame assemblies 20 and the central body 10 suitable for enabling one or more of the transformations described herein. For example, the transformation of the transformable frame assemblies 20 can be actuated by a drive unit 11 of the central body 10 via a suitable actuation assembly (also known as a transformation actuation assembly). The drive unit 11 and actuation assembly can be coupled to a fixed assembly 17 of the central body 10. A single drive unit and actuation assembly can be used to simultaneously transform all the transformable frame assemblies 20 of the UAV 100. For example, a single motor or other suitable actuator can be used to transform a plurality of or all of the transformable frame assemblies 20 of the UAV 100. Alternatively, a plurality of drive units and actuation assemblies can be used to separately transform each of the transformable frame assemblies 20. Any suitable driving mechanism can be used for the drive unit 11, such as a DC motor (e.g., brushed or brushless), AC motor, stepper motor, servo motor, and the like. The actuation assembly can use any suitable actuation element or combination of actuation elements to transform the UAV 100. Examples of suitable actuation mechanisms include gears, shafts, pulleys, screws, nuts spindles, belts, cables, wheels, axles, and the like. In some embodiments, the actuation assembly can include a linear actuator driven by the drive unit 11 in a linear reciprocating motion relative to the drive unit 11. For example, as illustrated in FIG. 2, the actuation assembly can be a screw and nut mechanism, including a screw 13 and a nut 15. The nut 15 can encircle the shaft of the screw 13 and be coupled to the screw 13 (e.g., via screw threading or interference fit). The drive unit 11 can be affixed to one end of the screw 13. Accordingly, the drive unit 11 can drive the rotation of the screw 13 (e.g., clockwise or counterclockwise) and thereby cause the nut 15 to move up or down along the length of the screw 13.

Alternatively or in combination, the actuation assembly can utilize a worm drive mechanism including a worm and worm gear (not shown). The worm can be coupled to the worm gear, such that rotation of the worm actuated by the drive unit 11 produces a corresponding rotation of the worm gear. The worm gear can be coupled to and operable to drive the screw 13 (e.g., via internal threading of the worm gear). Advantageously, the use of a worm drive mechanism as described herein can provide smoother drive transmission and improve drive reliability.

The fixed assembly 17 can be any structure suitable for accommodating the drive unit 11 and the actuation assembly, such as a frame, half-frame, or hollow structure. Although the fixed assembly 17 is depicted in FIGS. 1-4 as a hexagonal frame approximately bisected by the screw 13 and nut 15, the fixed assembly 17 can be any suitable two-dimensional or three-dimensional shape. In some embodiments, the fixed assembly 17 includes an upper portion 171 and a lower portion 173, with the upper portion 171 disposed coupled to the upper end of the screw 13 near the drive unit 11, and the lower portion 173 coupled to the lower end of the screw 13 away from the drive unit 11. Optionally, the upper and lower portions 171, 173 can be coupled to the screw 13 with suitable bearings (e.g., angular contact ball bearings) or rotary joints such that the screw 13 can rotate (e.g., when driven by the drive unit 11) with respect to the fixed assembly 17.

Any suitable configuration of transformable frame assemblies 20 can be used in conjunction with suitable embodiments of the fixed assembly 17, drive unit 11, and actuation assembly, as described above. In some embodiments, as illustrated in FIGS. 1-4, the transformable frame assemblies 20 each include a primary shaft 21 and a secondary shaft 23. Optionally, the secondary shaft 23 can be arranged parallel to or approximately parallel to the primary shaft 21. The actuation assembly can be operatively coupled to the primary shafts 21 and/or the secondary shafts 23, thereby enabling transformation of the transformable frame assemblies 20 by actuation of the primary shafts 21 and/or secondary shafts 23.

In some embodiments, the proximal end of primary shaft 21 is coupled to the nut 15 of the actuation assembly by means of one or more connectors 27. For example, two connectors 27 can be pivotally coupled to opposite sides of the proximal end of the primary shaft 21 and fixedly coupled to the nut 15. The connectors 27 can have any suitable geometry, such as a curved shape or a straight shape. The proximal end of the primary shaft 21 can also be coupled to the fixed assembly 17, such as by a joint 211 extending perpendicular to the screw 13. The joint 211 can be pivotally coupled to the primary shaft 21 and fixedly coupled to the fixed assembly 17 near the drive unit 11. Accordingly, each primary shaft 21 of the transformable frame assemblies 20 can pivot with respect to the central body 10 about the joint 211. Furthermore, as the nut 15 moves up or down along the screw 13, corresponding forces exerted on the primary shafts 21 through the connectors 27 cause the primary shafts 21 to pivot upwards or downwards relative to the central body 10, respectively.

The proximal end 231 of the secondary shaft 23 can be coupled to the lower portion 173 of the fixed assembly 17 (e.g., through coupling point 175). Optionally, the proximal ends 231 of each secondary shaft 23 of the transformable frame assemblies 20 are coupled to each other at the coupling point 175. The proximal ends 231 can be pivotally coupled such that the secondary shafts 23 can pivot with respect to the central body 10.

In some embodiments, the primary shaft 21 is coupled to the secondary shaft 23, such that an actuation of the primary shaft 21 (e.g., by the actuation assembly) produces a corresponding actuation of the secondary shaft 23. The primary shaft 21 and the secondary shaft 23 can be directly coupled to each other or indirectly coupled to each other. For example, the primary shaft 21 and the secondary shaft 23 can be coupled to each other through a connector 25. The connector 25 can be a Y-shaped structure, for example, with the two upper ends pivotally coupled to the distal end of the primary shaft 21 and the lower end pivotally coupled to the distal end 233 of the secondary shaft 23. The Y-shaped connector 25 can provide increased stability to the transformable frame assembly 20. Alternatively, the connector 25 can be any shape suitable for coupling the primary shaft 21 and the secondary shaft 23, such as a straight shaft, curved shaft, and the like. In this configuration, as the primary shaft 21 pivots relative to the central body 10 (e.g., driven by actuation of the nut 15 as described above), forces exerted by the connector 25 on the secondary shaft 23 produce a corresponding pivoting motion of the secondary shaft 23.

In some embodiments, a cross bar 29 is affixed to the distal end of the primary shaft 21. The cross bar 29 can extend in a direction perpendicular to the primary shaft 21 and/or the screw 13. The primary shaft 21 can be coupled to the cross bar 29 (e.g., at the midpoint of the cross bar 29) by a suitable coupling, such as a pivotal coupling. In some instances, the connector 25 is coupled to the cross bar 29 by means of suitable openings situated on the upper ends of the Y-shaped structure. The cross bar 29 can be used for mounting the propulsion units 30 and the support members 40. For example, the propulsion units 30 and the support members 40 can be coupled to the ends of the cross bar 29, or at any other suitable portion of the cross bar 29.

Figure 3:
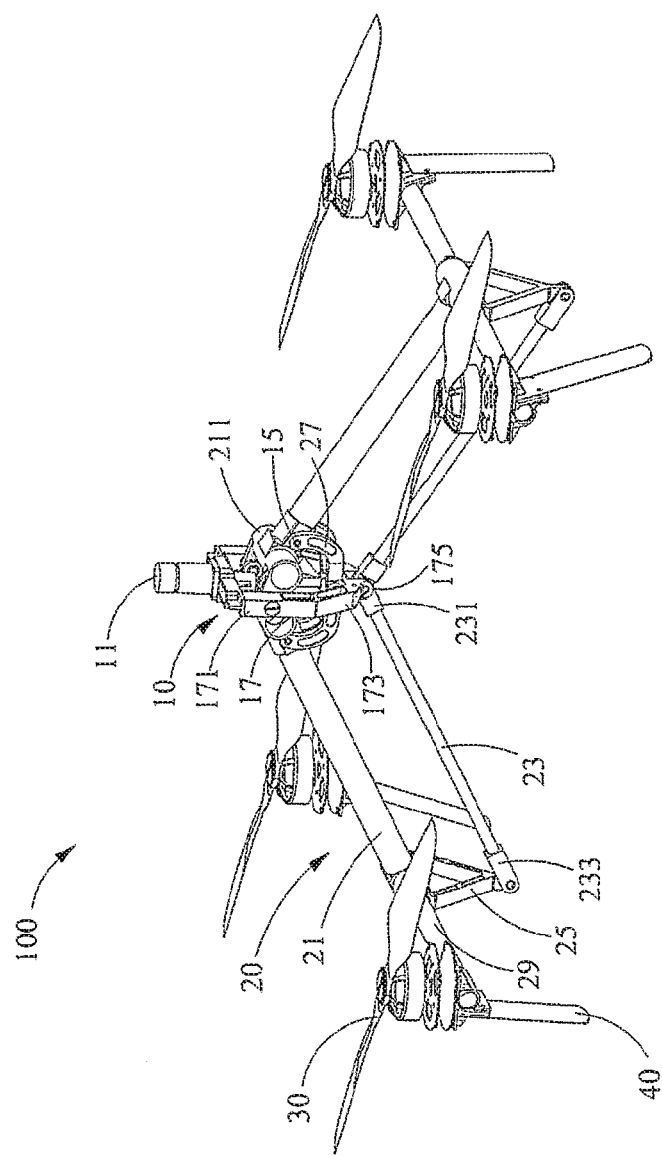
FIG. 3 illustrates the transformable unmanned aerial vehicle of FIG. 1 in a landing configuration, in accordance with embodiments.

The elements of the transformable frame assemblies 20 and central body 10 may be arranged in any suitable geometry. For example, as illustrated in FIG. 3, the transformable frame assembly 20 and the central body 10 can form a parallelogram or parallelogram-like shape. In this embodiment, the length of the primary shaft 21 (e.g., as measured between its proximal and distal couplings) is equal to or approximately equal to the length of the secondary shaft 23 (e.g., as measured between its proximal and distal couplings), and the length of the connector 25 (e.g., as measured between its upper and lower couplings) is equal to or approximately equal to the length of fixed assembly 17 (e.g., as measured between its coupling to the hinge 211 and the coupling point 175). However, other geometries can also be used. In some instances, elements of the transformable frame assemblies 20 (e.g., primary shaft 21, secondary shaft 23, connector 25) and the central body 10 (e.g., fixed assembly 17, screw 13) can be coupled to form triangular, square, rectangular, and other polygonal shapes. The elements may be linear, or one or more of the elements may be curved, such that a rounded, curved, or curvilinear shape is formed.

The UAV 100 can be transformed using the elements of the central body 10 and the transformable frame assemblies 20 described herein. In some embodiments, the UAV 100 can assume a first configuration (e.g., a takeoff/landing configuration) in which the drive unit 11 is off and the nut 15 is in the bottom position on the screw 13 closest to the proximal ends 231 of the secondary shafts 23. In the first configuration, the transformable frame assemblies 20 are angled downwards with respect to the central body 10, thereby enabling the support members 40 to contact the surface and support the UAV 100.

To transform the UAV 100 to a second configuration (e.g., a flight configuration), the drive unit 11 can be turned on to drive the rotation of the screw 13 in a first direction (e.g., clockwise). Consequently, the nut 15 moves upward along the screw 13 towards the drive unit 11, thereby transmitting an upward force to the primary shafts 21 through the connectors 27 that causes the primary shafts 21 to pivot upwards. As the primary shafts 21 and secondary shafts 23 are coupled by means of the connectors 25, as previously described herein, the secondary shafts 23 are also pivoted upwards, and the vertical angle of the transformable assemblies 20 relative to the central body 10 is changed. The movement of the nut 15 is stopped once it reaches the uppermost position on the screw 13, thereby maintaining the UAV 100 in the second configuration in which the transformable frame assemblies 20 are angled upwards with respect to the central body 10.

In the second configuration, the upward tilt of the transformable assemblies 20 increases the space beneath the central body 10. Accordingly, the second configuration can increase the functional space for a functional payload situated underneath the central body 10, as previously described herein.

To return the UAV 100 to the first configuration, the drive unit 11 can be used to drive the screw 13 to rotate in the opposite direction (e.g., counterclockwise), so that the nut 15 moves downwards away from the drive unit 11. Thus, a downward force is exerted on the primary shafts 21 through the connectors 27, and subsequently on to the secondary shafts 23 through the connectors 25. Consequently, the transformable frame assemblies 20 are pivoted downwards relative to the central body 10 to support the UAV 100 on a surface.

FIGS. 5-10 illustrate another exemplary transformable UAV 100a, in accordance with embodiments. The design principles of the UAV 100a are fundamentally the same as those of the UAV 100, and any element of the UAV 100a not specifically described herein can be assumed to be the same as in the UAV 100. The UAV 100a differs from the UAV 100 primarily in the structure of the fixed assembly 17a and the arrangement of the primary and secondary shafts 21a, 23a.

In some embodiments, the fixed assembly 17a of the UAV 100a forms a pentagon having a first side 171a, a second side 173a, a third side 175a, a fourth side 177a, and a fifth side 179a. The first side 171a can be perpendicular to the second side 173a and coupled to the lower end of the screw 13. The third side 175a can be perpendicular to the second side 173a and coupled to the upper end of the screw 13. The fourth side 177a can be oriented at an obtuse angle relative to the fifth side 179a, and the fifth side 179a can be oriented at an obtuse angle relative to the first side 171a. An extension 18 can be formed with the third side 175a, for example, in a direction extending parallel with the first side 171a. The extension 18 can include a plurality of interfaces 181 (e.g., card interfaces). The interface 181 can be used to releasably couple a payload (e.g., a camera or robotic arm) or a battery.

Figure 6:
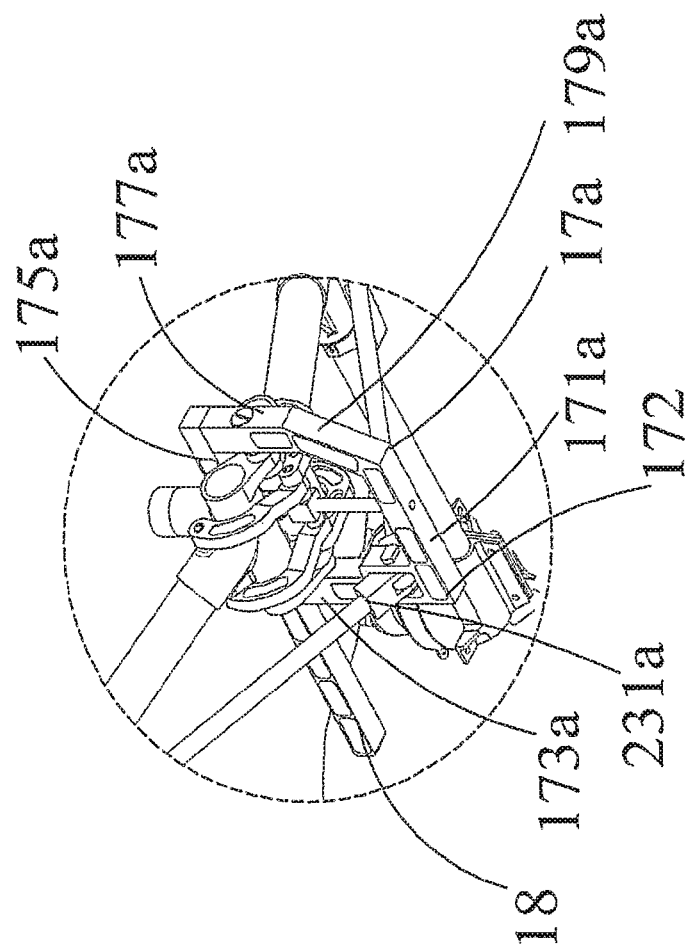
FIG. 6 is a closer view of the region VI of FIG. 5, in accordance with embodiments.

In some embodiments, the UAV 100a includes a pair of transformable frame assemblies each having a primary shaft 21a and a secondary shaft 23a. The proximal end of each primary shaft 21a can be coupled to the actuation assembly and the fixed assembly 17a, similar to the configuration of the UAV 100. The proximal ends 231a of the secondary shafts 23b can be coupled to the fixed assembly 17a and to each other at a coupling point 172 of the fixed assembly 17a. Although the coupling point 172 is depicted in FIG. 6 as situated at the intersection of the first and second sides 171a and 173a, the coupling point 172 can be located on any suitable portion of the fixed assembly 17a.

Figure 7:
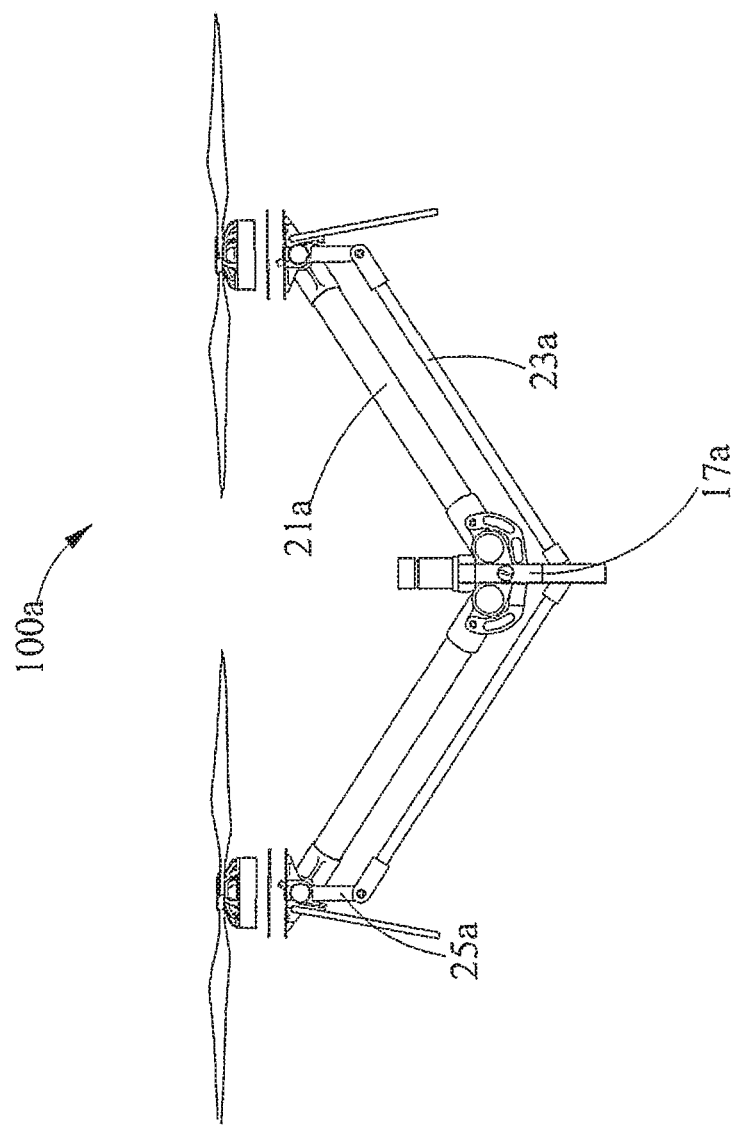
FIG. 7 is a side view of the transformable unmanned aerial vehicle of FIG. 5 in a flight configuration, in accordance with embodiments.
Figure 8:
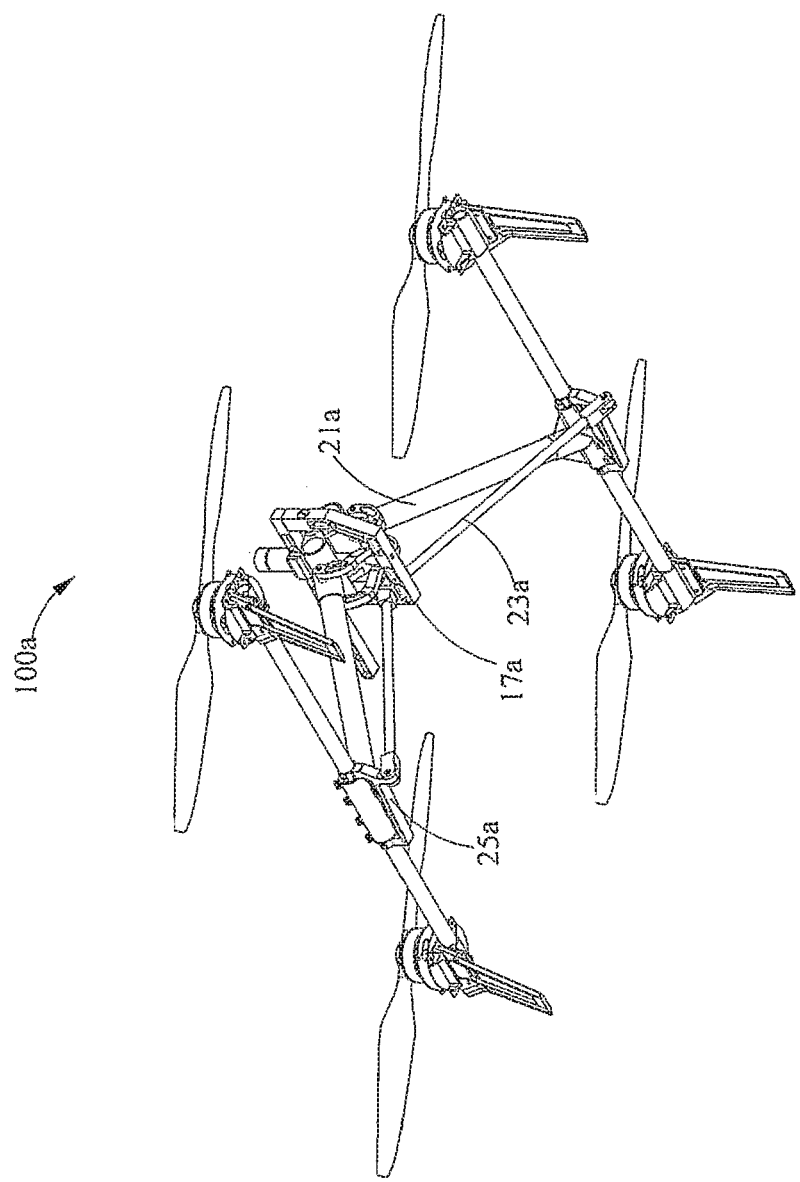
FIG. 8 illustrates the transformable unmanned aerial vehicle of FIG. 5 in a landing configuration, in accordance with embodiments.
Figure 9:
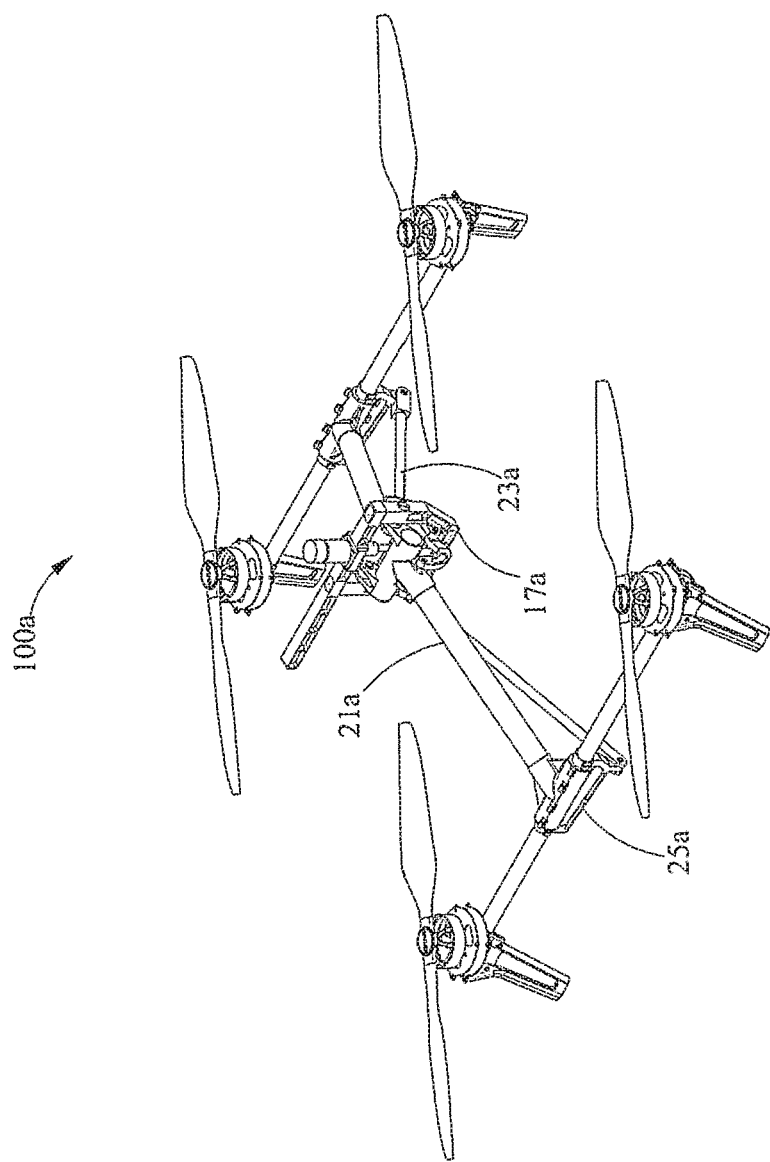
FIG. 9 also illustrates the transformable unmanned aerial vehicle of FIG. 5 in a landing configuration, in accordance with embodiments.
Figure 10:
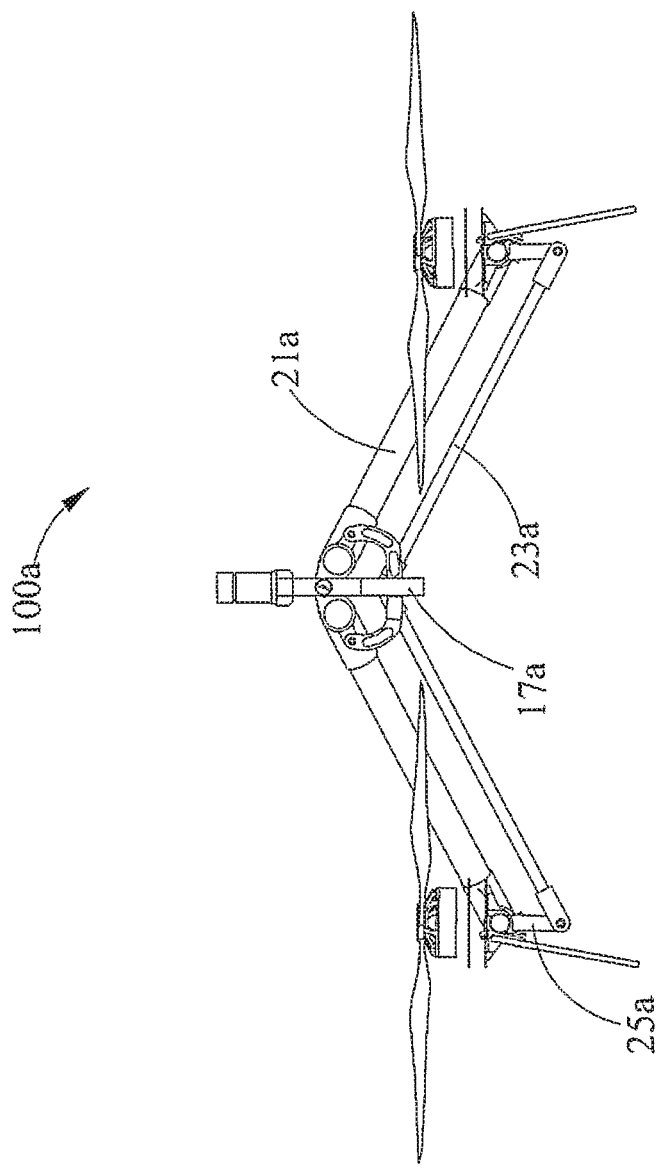
FIG. 10 is a side view of the transformable unmanned aerial vehicle of FIG. 5 in a landing configuration, in accordance with embodiments.
Figure 11:
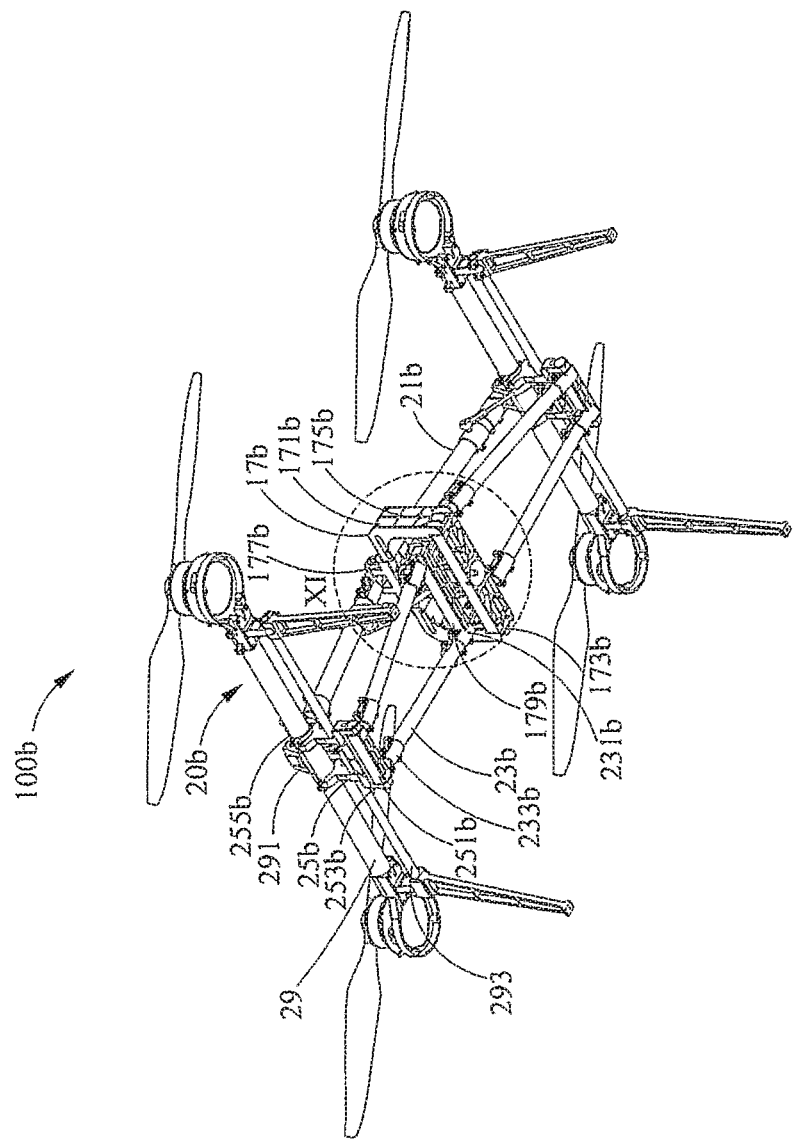
FIG. 11 illustrates yet another example of a transformable unmanned aerial vehicle in a landing configuration, in accordance with embodiments.
Figure 12:
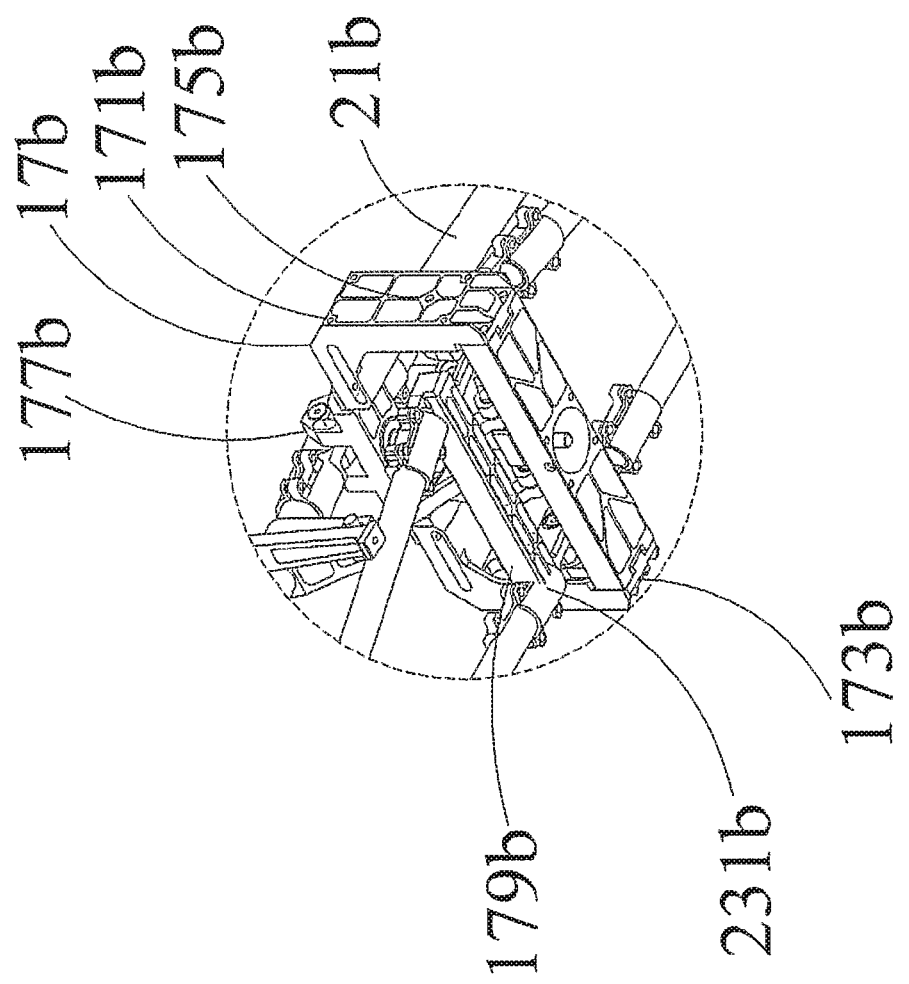
FIG. 12 is a closer view of the region XI of FIG. 11, in accordance with embodiments.
Figure 13:
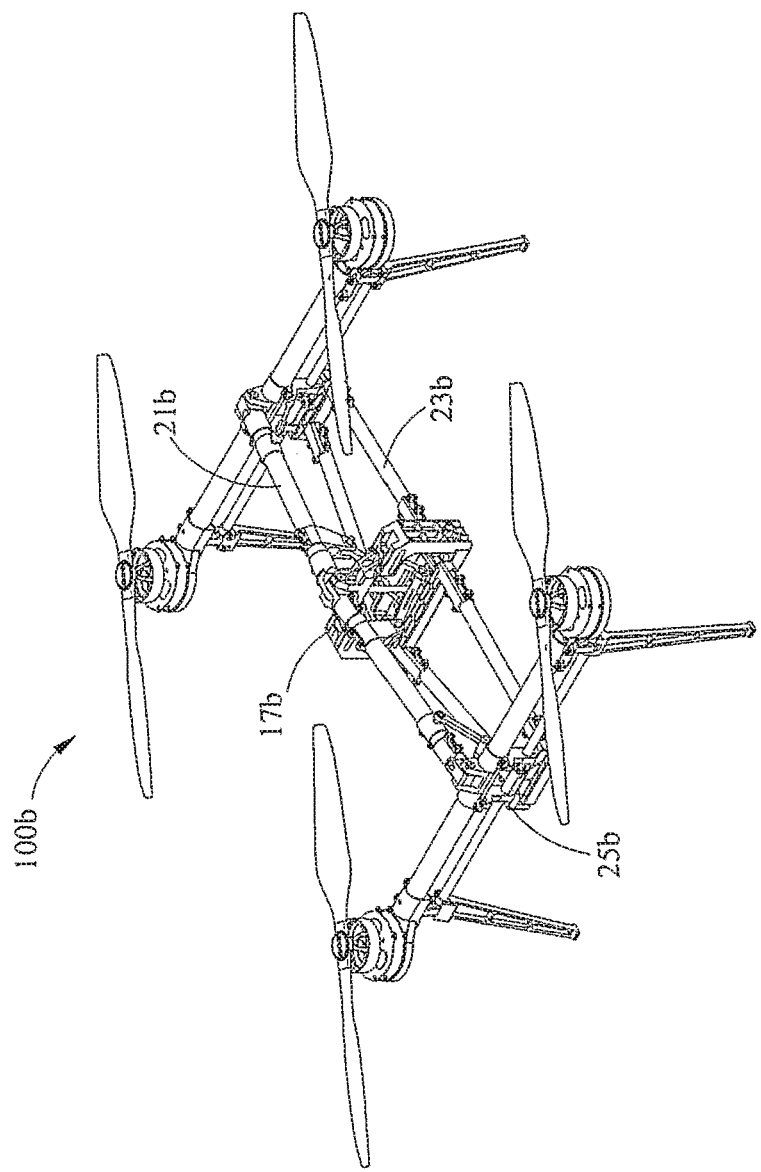
FIG. 13 also illustrates the transformable unmanned aerial vehicle of FIG. 11 in a landing configuration, in accordance with embodiments.
Figure 14:
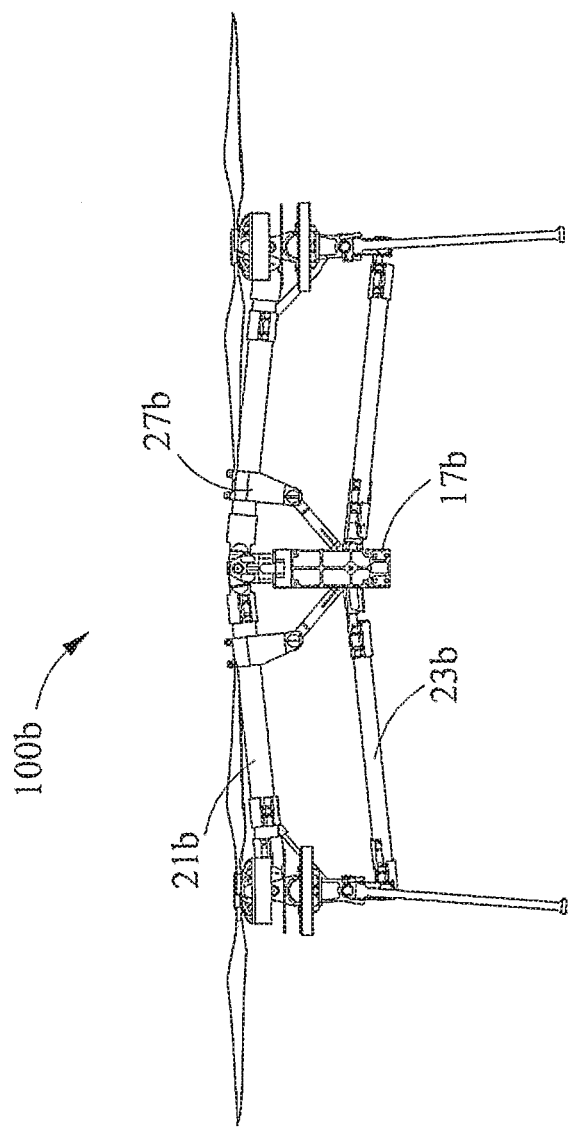
FIG. 14 is a side view of the transformable unmanned aerial vehicle of FIG. 11 in a landing configuration, in accordance with embodiments.

The primary shaft 21a and the secondary shaft 23a can be coupled to each other by a connector 25a. Similar to embodiments of the UAV 100, the connector 25a can also be pivotally coupled to a cross bar for mounting propulsion units and/or support members. In this embodiment, the distal end of the primary shaft 21a is coupled to the upper ends of the connector 25a, and the distal end 233a of the secondary shaft 23a is coupled to the lower end 251 of the connector. The lower end 251 can be offset from the centerline of the connector 25a and be positioned, for example, at a corner of the connector 25a, such that the distal end 233a of the secondary shaft 23a is offset to one side of the distal end of the primary shaft 21a. In some instances, the distal end 233a is positioned on one side of the primary shaft 21a and the proximal end 231a is positioned on the opposite side, thereby causing the primary shaft 21a and the secondary shaft 23a to be horizontally skewed relative to each other. The primary shaft 21a and the secondary shaft 23a can still be parallel with respect to a vertical plane (e.g., as depicted in FIGS. 7 and 10). This skewed configuration decreases the vertical distance between the primary shaft 21a and the secondary shaft 23a, thereby enabling a more compact design for the UAV 100a.

Similar to the UAV 100, the transformable frame assembly and the central body of the UAV 100a can form a parallelogram or parallelogram-like shape. In this embodiment, the length of the primary shaft 21a (e.g., as measured between its proximal and distal couplings) is equal to or approximately equal to the length of the secondary shaft 23a (e.g., as measured between its proximal and distal couplings), and the length of the connector 25a (e.g., as measured between its upper and lower couplings) is equal to or approximately equal to the length of fixed assembly 17 (e.g., as measured between its coupling to the primary shaft 21a and the coupling point 172). However, other suitable geometries can also be used, as previously described herein.

The UAV 100a can be transformed in a manner similar to that of the UAV 100, and any aspects of the transformation not specifically described herein can be assumed to be the same as for the UAV 100. Briefly, the actuation assembly of the UAV 100a can actuate the coupled primary and secondary shafts 21a and 23a to be angled upwards with respect to the central body (e.g., FIGS. 5, 7) or angled downwards with respect to the central body (e.g., FIGS. 8-10). The upwards configuration can be used to increase the functional space of a coupled payload, while the downwards configuration can be used to provide support to the UAV 100a when resting on a surface.

FIGS. 11-14 illustrate another exemplary transformable UAV 100b, in accordance with embodiments. The design principles of the UAV 100b are fundamentally the same as those of the UAV 100, and any element of the UAV 100b not specifically described herein can be assumed to be the same as in the UAV 100. The UAV 100b differs from the UAV 100 primarily in the structure of the fixed assembly 17b and the arrangement of the primary and secondary shafts 21b, 23b. In particular, each transformable frame assembly 20b of the UAV 100b includes a primary shaft 21b and two secondary shafts 23b that can be arranged to form a triangular prism or triangular prism-like shape.

In some embodiments, the fixed assembly 17b forms an approximately rectangular frame having a top side 171b, a bottom side 173b, and opposed lateral sides 175b. The proximal end of each of the pair of primary shafts 21b can be pivotally coupled to the fixed assembly 17b and to each other at the top side 171b (e.g., at coupling point 177b). The proximal end can also be coupled to an actuation assembly within the fixed assembly 17b by one or more connectors, as previously described herein with respect to the UAV 100.

The proximal ends 231b of the secondary shafts 23b can be respectively pivotally coupled to any suitable portion of the fixed assembly 17b, such as at coupling points 179b situated within the fixed assembly 17b at the two ends of the bottom side 173b where it joins the lateral sides 175b. In some embodiments, the proximal ends 231b of each pair of secondary shafts 23b are symmetrically situated on opposite sides of the proximal end of the corresponding primary shaft 21b.

Each primary shaft 21b is coupled to the corresponding pair of secondary shafts 23b by means of a connector 25b and a cross bar 29. The connector 25b can be approximately rectangular, with the length and width of the connector 25b being smaller than a corresponding length and width of the fixed assembly 17b. The connector 25b can include a bottom side 251b and two parallel opposite lateral sides 253b. The lateral sides 253b can extend upwards along a direction perpendicular to the bottom side 251b. The connector 25b can be pivotally coupled to the cross bar 29 passing through the rings 255b situated on the upward ends of the lateral sides 253b. The distal end of the primary shaft 21b can be pivotally coupled to the cross bar 29b, for example, by means of a hinge 291 mounted on the portion of the cross bar 29 between the rings 255b. The distal ends 233b of the secondary shafts 23b can be respectively pivotally coupled to the ends of the bottom side 251b. In some embodiments, the distal ends 233b of each pair of secondary shafts 23b are symmetrically situated on opposite sides of distal end of the corresponding primary shaft 21b. The length of the bottom side 251b can be smaller than the length of the bottom side 173b, such that the separation between distal ends 233b is smaller than the separation between the proximal ends 231b. Alternatively, the lengths can be equal or approximately equal, such that the separation between the distal and proximal ends 233b, 231b of the secondary shafts 23b are equal or approximately equal.

The cross bar 29 can be used to mount propulsion units and/or support members. In some embodiments, the cross bar 29 is parallel to the bottom side 251b of the connector 25b. Optionally, a reinforcing bar 293 can be situated underneath and parallel to the cross bar 29, passing through the lateral sides 253b of the connector 25b. The ends of the reinforcing bar 293 can be coupled to propulsion units mounted on respective ends of the cross bar 29, thereby increasing stability and support for the propulsion units.

Similar to the UAV 100, the transformable frame assembly and the central body of the UAV 100b can form a parallelogram or parallelogram-like shape. In this embodiment, the length of the primary shaft 21b (e.g., as measured between its proximal and distal couplings) is equal to or approximately equal to the length of the secondary shafts 23b (e.g., as measured between their proximal and distal couplings), and the length of the connector 25b (e.g., as measured between its upper and lower couplings) is equal to or approximately equal to the length of fixed assembly 17

(e.g., as measured between the coupling points 177b and 179b). However, other suitable geometries can also be used, as previously described herein.

The UAV 100b can be transformed in a manner similar to that of the UAV 100, and any aspects of the transformation not specifically described herein can be assumed to be the same as for the UAV 100. Briefly, the actuation assembly of the UAV 100b can actuate the coupled primary and secondary shafts 21b and 23b to be angled upwards or downwards with respect to the central body. The upwards configuration can be used to increase the functional space of a coupled payload, while the downwards configuration can be used to provide support to the UAV 100a when resting on a surface (e.g., FIGS. 11, 13, and 14).

Suitable elements of any of transformable aerial vehicles described herein may be combined with or substituted with suitable elements from any other embodiment. The elements of the transformable aerial vehicles described herein may be flexible elements or rigid elements, and can be fabricated using any suitable material or combination of materials. Suitable materials can include metals (e.g., stainless steel, aluminum), plastics (e.g., polystyrene, polypropylene), wood, composite materials (e.g., carbon fiber), and the like. The materials for the transformable aerial vehicles can be selected based on one or more of strength, weight, durability, stiffness, cost, processing characteristics, and other material properties. The couplings between elements described herein may involve interference fits, clearance fits, transition fits, and suitable combinations thereof. Pivotal couplings can include ball bearings, hinges, and other suitable rotary joints. Fixed couplings may utilize one or more fasteners, such as nails, screws, bolts, clips, ties, and the like. In some embodiments, the materials and couplings can be configured to enhance stability and reduce vibration of the transformable aerial vehicle during operation.

The systems, devices, and methods described herein can be applied to a wide variety of movable objects. As previously mentioned, any description herein of an aerial vehicle may apply to and be used for any movable object. A movable object of the present invention can be configured to move within any suitable environment, such as in the air (e.g., a fixed-wing aircraft or a rotary-wing aircraft), in the water (e.g., a ship or a submarine), on the ground (e.g., a motor vehicle or a train), under the ground (e.g., a subway), in space (e.g., a spaceplane, a satellite, or a probe), or any combination of these environments. The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof.

In some instances, the movable object can be a vehicle. In addition to aerial vehicles, suitable vehicles may include water vehicles, space vehicles, or ground vehicles. The systems, devices, and methods disclosed herein can be used for any vehicle capable of lifting off from and landing on surfaces (e.g., an underwater surface such as a sea floor, an extraterrestrial surface such as an asteroid). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof.

The aerial vehicles of the present disclosure can include fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). The aerial vehicle may be capable of moving freely within the environment with respect to six degrees of freedom (e.g., three degrees of freedom in translation and three degrees of freedom in rotation). Alternatively, the movement of the aerial vehicle can be constrained with respect to one or more degrees of freedom, such as by a predetermined path or track. The movement can be actuated by any suitable actuation mechanism, such as an engine or a motor. In some embodiments, the aerial vehicle can be a self-propelled aerial vehicle. Self-propelled aerial vehicles can be driven by a propulsion system as previously described herein. The propulsion system can be used to enable the aerial vehicle to take off from a surface, land on a surface, maintain its current position and/or orientation (e.g., hover), change orientation, and/or change position.

For example, the propulsion system can include one or more rotors. A rotor can include one or more blades (e.g., one, two, three, four, or more blades) affixed to a central shaft. The blades can be disposed symmetrically or asymmetrically about the central shaft. The blades can be turned by rotation of the central shaft, which can be driven by a suitable motor or engine. The blades can be configured to spin in a clockwise rotation and/or a counterclockwise rotation. The rotor can be a horizontal rotor (which may refer to a rotor having a horizontal plane of rotation), a vertically oriented rotor (which may refer to a rotor having a vertical plane of rotation), or a rotor tilted at an intermediate angle between the horizontal and vertical positions. In some embodiments, horizontally oriented rotors may spin and provide lift to the aerial vehicle. Vertically oriented rotors may spin and provide thrust to the aerial vehicle. Rotors oriented an intermediate angle between the horizontal and vertical positions may spin and provide both lift and thrust to the aerial vehicle. One or more rotors may be used to provide a torque counteracting a torque produced by the spinning of another rotor.

The aerial vehicle can be controlled remotely by a user or controlled locally by an occupant within or on the aerial vehicle. In some embodiments, the aerial vehicle is a UAV. An UAV may not have an occupant onboard the aerial vehicle. The aerial vehicle can be controlled by a human or an autonomous control system (e.g., a computer control system), or any suitable combination thereof. The aerial vehicle can be an autonomous or semi-autonomous robot, such as a robot configured with an artificial intelligence.

The aerial vehicle can have any suitable size and/or dimensions. In some embodiments, the aerial vehicle may be of a size and/or dimensions to have a human occupant within or on the vehicle. Alternatively, the aerial vehicle may be of size and/or dimensions smaller than that capable of having a human occupant within or on the vehicle. The aerial vehicle may be of a size and/or dimensions suitable for being lifted or carried by a human. Alternatively, the aerial vehicle may be larger than a size and/or dimensions suitable for being lifted or carried by a human. In some instances, the aerial vehicle may have a maximum dimension (e.g., length, width, height, diameter, diagonal) of less than or equal to about: 2 cm, 5 cm, 10 cm, 50 cm, 1 m, 2 m, 5 m, or 10 m.

The maximum dimension may be greater than or equal to about: 2 cm, 5 cm, 10 cm, 50 cm, 1 m, 2 m, 5 m, or 10 m. For example, the distance between shafts of opposite rotors of the aerial vehicle may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the aerial vehicle may have a volume of less than 100 cm×100 cm×100 cm, less than 50 cm×50 cm×30 cm, or less than 5 cm×5 cm×3 cm. The total volume of the aerial vehicle may be less than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$. Conversely, the total volume of the aerial vehicle may be greater than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$.

In some embodiments, the aerial vehicle may have a footprint (which may refer to the lateral cross-sectional area encompassed by the aerial vehicle) less than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$. Conversely, the footprint may be greater than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$.

In some instances, the aerial vehicle may weigh no more than 1000 kg. The weight of the aerial vehicle may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, an aerial vehicle may be small relative to a load carried by the aerial vehicle. The load may include a payload and/or a carrier, as described in further detail below. In some examples, a ratio of an aerial vehicle weight to a load weight may be greater than, less than, or equal to about 1:1. In some instances, a ratio of an aerial vehicle weight to a load weight may be greater than, less than, or equal to about 1:1. Optionally, a ratio of a carrier weight to a load weight may be greater than, less than, or equal to about 1:1. When desired, the ratio of an aerial vehicle weight to a load weight may be less than or equal to: 1:2, 1:3, 1:4, 1:5, 1:10, or even less. Conversely, the ratio of an aerial vehicle weight to a load weight can also be greater than or equal to: 2:1, 3:1, 4:1, 5:1, 10:1, or even greater.

In some embodiments, the aerial vehicle may have low energy consumption. For example, the aerial vehicle may use less than about: 5 W/h, 4 W/h, 3 W/h, 2 W/h, 1 W/h, or less. In some instances, a carrier of the aerial vehicle may have low energy consumption. For example, the carrier may use less than about: 5 W/h, 4 W/h, 3 W/h, 2 W/h, 1 W/h, or less. Optionally, a payload of the aerial vehicle may have low energy consumption, such as less than about: 5 W/h, 4 W/h, 3 W/h, 2 W/h, 1 W/h, or less.

In some embodiments, the aerial vehicle can be configured to carry a load. The load can include one or more of passengers, cargo, equipment, instruments, and the like. The load can be provided within a housing. The housing may be separate from a housing of the aerial vehicle, or be part of a housing for an aerial vehicle. Alternatively, the load can be provided with a housing while the aerial vehicle does not have a housing. Alternatively, portions of the load or the entire load can be provided without a housing. The load can be rigidly fixed relative to the aerial vehicle. Optionally, the load can be movable relative to the aerial vehicle (e.g., translatable or rotatable relative to the aerial vehicle).

In some embodiments, the load includes a payload. The payload can be configured not to perform any operation or function. Alternatively, the payload can be a payload configured to perform an operation or function, also known as a functional payload. For example, the payload can include one or more sensors for surveying one or more targets. Any suitable sensor can be incorporated into the payload, such as an image capture device (e.g., a camera), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for the target of the payload. Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the aerial vehicle. Optionally, the payload can be configured to interact with the environment or a target. For example, the payload can include a tool, instrument, or mechanism capable of manipulating objects, such as a robotic arm.

Optionally, the load may include a carrier. The carrier can be provided for the payload and the payload can be coupled to the aerial vehicle via the carrier, either directly (e.g., directly contacting the aerial vehicle) or indirectly (e.g., not contacting the aerial vehicle). Conversely, the payload can be mounted on the aerial vehicle without requiring a carrier. The payload can be integrally formed with the carrier. Alternatively, the payload can be releasably coupled to the carrier. In some embodiments, the payload can include one or more payload elements, and one or more of the payload elements can be movable relative to the aerial vehicle and/or the carrier, as described above.

The carrier can be integrally formed with the aerial vehicle. Alternatively, the carrier can be releasably coupled to the aerial vehicle. The carrier can be coupled to the aerial vehicle directly or indirectly. The carrier can provide support to the payload (e.g., carry at least part of the weight of the payload). The carrier can include a suitable mounting structure (e.g., a gimbal platform) capable of stabilizing and/or directing the movement of the payload. In some embodiments, the carrier can be adapted to control the state of the payload (e.g., position and/or orientation) relative to the aerial vehicle. For example, the carrier can be configured to move relative to the aerial vehicle (e.g., with respect to one, two, or three degrees of translation and/or one, two, or three degrees of rotation) such that the payload maintains its position and/or orientation relative to a suitable reference frame regardless of the movement of the aerial vehicle. The reference frame can be a fixed reference frame (e.g., the surrounding environment). Alternatively, the reference frame can be a moving reference frame (e.g., the aerial vehicle, a payload target).

In some embodiments, the carrier can be configured to permit movement of the payload relative to the carrier and/or aerial vehicle. The movement can be a translation with respect to up to three degrees of freedom (e.g., along one, two, or three axes) or a rotation with respect to up to three degrees of freedom (e.g., about one, two, or three axes), or any suitable combination thereof.

In some instances, the carrier can include a carrier frame assembly and a carrier actuation assembly. The carrier frame assembly can provide structural support to the payload. The carrier frame assembly can include individual carrier frame components, some of which can be movable relative to one another. The carrier actuation assembly can include one or more actuators (e.g., motors) that actuate movement of the individual carrier frame components. The actuators can permit the movement of multiple carrier frame components simultaneously, or may be configured to permit the movement of a single carrier frame component at a time. The movement of the carrier frame components can produce a corresponding movement of the payload. For example, the carrier actuation assembly can actuate a rotation of one or more carrier frame components about one or more axes of rotation (e.g., roll axis, pitch axis, or yaw axis). The rotation of the one or more carrier frame components can cause a payload to rotate about one or more axes of rotation relative to the aerial vehicle. Alternatively or in combination, the carrier actuation assembly can actuate a translation of one or more carrier frame components along one or more axes of translation, and thereby produce a translation of the payload along one or more corresponding axes relative to the aerial vehicle.

In some embodiments, the movement of the aerial vehicle, carrier, and payload relative to a fixed reference frame (e.g., the surrounding environment) and/or to each other, can be controlled by a terminal. The terminal can be a remote control device at a location distant from the aerial vehicle, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the aerial vehicle, carrier, and/or payload. For example, the terminal can be used to control the position and/or orientation of the aerial vehicle, carrier, and/or payload relative to a fixed reference from and/or to each other. In some embodiments, the terminal can be used to control individual elements of the aerial vehicle, carrier, and/or payload, such as the actuation assembly of the carrier, a sensor of the payload, or an emitter of the payload. The terminal can include a wireless communication device adapted to communicate with one or more of the aerial vehicle, carrier, or payload.

The terminal can include a suitable display unit for viewing information of the aerial vehicle, carrier, and/or payload. For example, the terminal can be configured to display information of the aerial vehicle, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Figure 15:
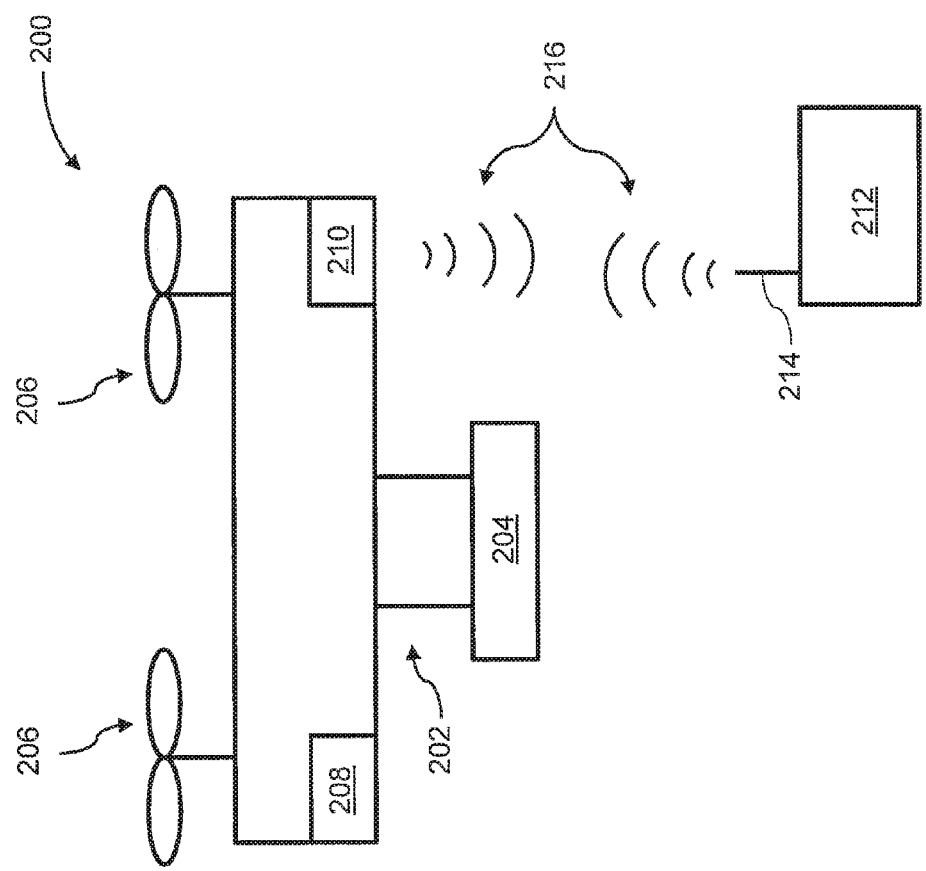
FIG. 15 illustrates an aerial vehicle including a carrier and a payload, in accordance with embodiments.

FIG. 15 illustrates an aerial vehicle 200 including a carrier 202 and a payload 204, in accordance with embodiments. Alternatively, the payload 204 may be provided on the aerial vehicle 200 without requiring the carrier 202. The aerial vehicle 200 may include propulsion mechanisms 206, a sensing system 208, and a transceiver 210. The propulsion mechanisms 206 can include one or more of rotors, propellers, blades, engines, motors, wheels, axles, magnets, or nozzles, as previously described herein. The aerial vehicle may have one or more, two or more, three or more, or four or more propulsion mechanisms. The propulsion mechanisms may all be of the same type. Alternatively, one or more propulsion mechanisms can be different types of propulsion mechanisms. In some embodiments, the propulsion mechanisms 206 can enable the aerial vehicle 200 to take off vertically from a surface or land vertically on a surface without requiring any horizontal movement of the aerial vehicle 200 (e.g., without traveling down a runway). Optionally, the propulsion mechanisms 206 can be operable to permit the aerial vehicle 200 to hover in the air at a specified position and/or orientation.

For example, the aerial vehicle 200 can have multiple horizontally oriented rotors that can provide lift and/or thrust to the aerial vehicle. The multiple horizontally oriented rotors can be actuated to provide vertical takeoff, vertical landing, and hovering capabilities to the aerial vehicle 200. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the aerial vehicle 200 (e.g., with respect to up to three degrees of translation and up to three degrees of rotation).

The sensing system 208 can include one or more sensors that may sense the spatial disposition, velocity, and/or acceleration of the aerial vehicle 200 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 208 can be used to control the spatial disposition, velocity, and/or orientation of the aerial vehicle 200 (e.g., using a suitable processing unit and/or control module, as described below). Alternatively, the sensing system 208 can be used to provide data regarding the environment surrounding the aerial vehicle, such as weather conditions, proximity to potential obstacles, location of geographical features, location of manmade structures, and the like.

The transceiver 210 enables communication with terminal 212 having a transceiver 214 via wireless signals 216. In some embodiments, the communication can include two-way communication, with the terminal 212 providing control commands to one or more of the aerial vehicle 200, carrier 202, and payload 204, and receiving information from one or more of the aerial vehicle 200, carrier 202, and payload 204 (e.g., position and/or motion information of the aerial vehicle, carrier or payload; data sensed by the payload such as image data captured by a payload camera). In some instances, control commands from the terminal may include instructions for relative positions, movements, actuations, or controls of the aerial vehicle, carrier and/or payload. For example, the control command may result in a modification of the location and/or orientation of the aerial vehicle (e.g., via control of the propulsion mechanisms 206), or a movement of the payload with respect to the aerial vehicle (e.g., via control of the carrier 202). The control command from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the aerial vehicle, carrier and/or payload may include information from one or more sensors (e.g., of the sensing system 208 or of the payload 204). The communications may include sensed information from one or more different types of sensors (e.g., GPS sensors, motion sensors, inertial sensor, proximity sensors, or image sensors). Such information may pertain to the position (e.g., location, orientation), movement, or acceleration of the aerial vehicle, carrier and/or payload. Such information from a payload may include data captured by the payload or a sensed state of the payload. The control commands provided transmitted by the terminal 212 can be configured to control a state of one or more of the aerial vehicle 200, carrier 202, or payload 204. Alternatively or in combination, the carrier 202 and payload 204 can also each include a transceiver configured to communicate with terminal 212, such that the terminal can communicate with and control each of the aerial vehicle 200, carrier 202, and payload 204 independently.

Figure 16:
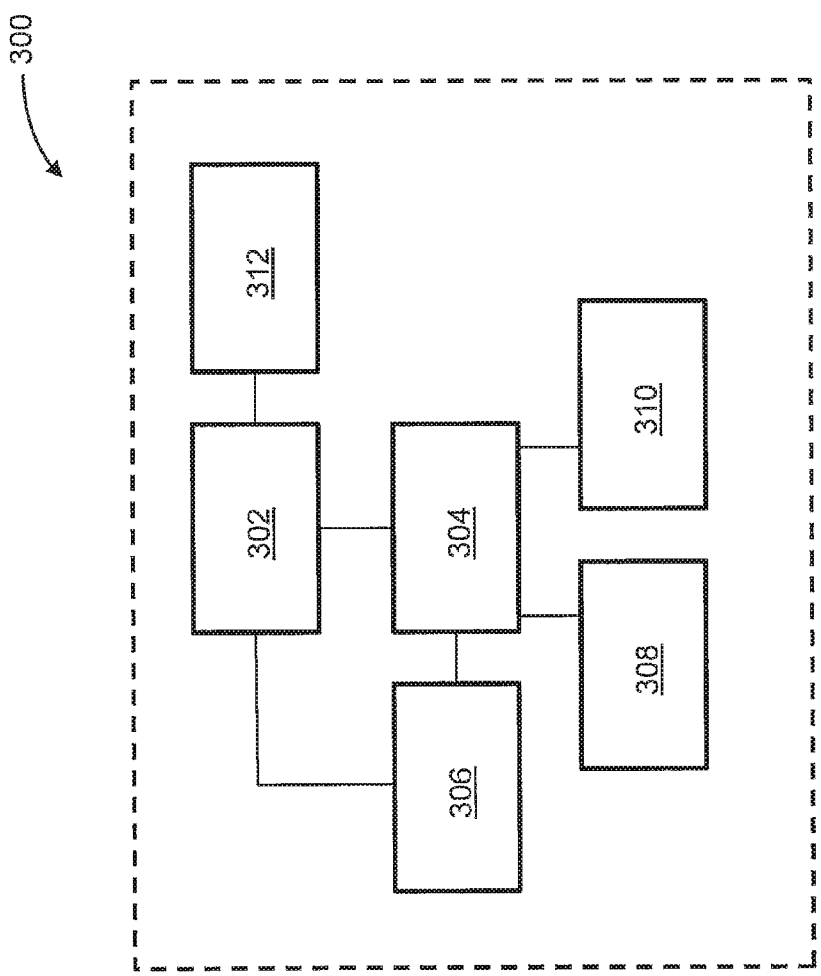
FIG. 16 is a schematic illustration by way of block diagram of a system for controlling an aerial vehicle, in accordance with embodiments.

FIG. 16 is a schematic illustration by way of block diagram of a system 300 for controlling an aerial vehicle, in accordance with embodiments. The system 300 can be used in combination with any suitable embodiment of the systems, devices, and methods disclosed herein. The system 300 can include a sensing module 302, processing unit 304, non-transitory computer readable medium 306, control module 308, and communication module 310.

The sensing module 302 can utilize different types of sensors that collect information relating to the aerial vehicles in different ways. Different types of sensors may sense different types of signals or signals from different sources. For example, the sensors can include inertial sensors, GPS sensors, proximity sensors (e.g., lidar), or vision/image sensors (e.g., a camera). The sensing module 302 can be operatively coupled to a processing unit 304 having a plurality of processors. In some embodiments, the sensing module can be operatively coupled to a transmission module 312 (e.g., a Wi-Fi image transmission module) configured to directly transmit sensing data to a suitable external device or system. For example, the transmission module 312 can be used to transmit images captured by a camera of the sensing module 302 to a remote terminal.

The processing unit 304 can have one or more processors, such as a programmable processor (e.g., a central processing unit (CPU)). The processing unit 304 can be operatively coupled to a non-transitory computer readable medium 306. The non-transitory computer readable medium 306 can store logic, code, and/or program instructions executable by the processing unit 304 for performing one or more steps. The non-transitory computer readable medium can include one or more memory units (e.g., removable media or external storage such as an SD card or random access memory (RAM)). In some embodiments, data from the sensing module 302 can be directly conveyed to and stored within the memory units of the non-transitory computer readable medium 306. The memory units of the non-transitory computer readable medium 306 can store logic, code and/or program instructions executable by the processing unit 304 to perform any suitable embodiment of the methods described herein. For example, the processing unit 304 can be configured to execute instructions causing one or more processors of the processing unit 304 to analyze sensing data produced by the sensing module. The memory units can store sensing data from the sensing module to be processed by the processing unit 304. In some embodiments, the memory units of the non-transitory computer readable medium 306 can be used to store the processing results produced by the processing unit 304.

In some embodiments, the processing unit 304 can be operatively coupled to a control module 308 configured to control a state of the aerial vehicle. For example, the control module 308 can be configured to control the propulsion mechanisms of the aerial vehicle to adjust the spatial disposition, velocity, and/or acceleration of the movable object with respect to six degrees of freedom. Alternatively or in combination, the control module 308 can control one or more of a state of a carrier, payload, or sensing module.

The processing unit 304 can be operatively coupled to a communication module 310 configured to transmit and/or receive data from one or more external devices (e.g., a terminal, display device, or other remote controller). Any suitable means of communication can be used, such as wired communication or wireless communication. For example, the communication module 310 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 310 can transmit and/or receive one or more of sensing data from the sensing module 302, processing results produced by the processing unit 304, predetermined control data, user commands from a terminal or remote controller, and the like.

The components of the system 300 can be arranged in any suitable configuration. For example, one or more of the components of the system 300 can be located on the aerial vehicle, carrier, payload, terminal, sensing system, or an additional external device in communication with one or more of the above. Additionally, although FIG. 16 depicts a single processing unit 304 and a single non-transitory computer readable medium 306, one of skill in the art would appreciate that this is not intended to be limiting, and that the system 300 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 300 can occur at one or more of the aforementioned locations.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An aerial vehicle comprising:
   a central body;
   a plurality of frame assemblies coupled to the central body;
   an actuation assembly coupled to the plurality of frame assemblies, wherein the actuation assembly comprises a linear actuator, wherein each frame assembly of the plurality of frame assemblies comprises a portion coupled to the linear actuator, and wherein the actuation assembly is configured to actuate the plurality of frame assemblies to a plurality of different angles between the plurality of frame assemblies with respect to a vertical axis; and
   a plurality of propulsion units operable to move the aerial vehicle, wherein each frame assembly of the plurality of frame assemblies supports at least one propulsion unit,
   wherein a linear motion of the linear actuator is substantially parallel to a yaw axis of the aerial vehicle.

2. The vehicle of claim 1, wherein the aerial vehicle is an unmanned aerial vehicle.

3. The vehicle of claim 1, wherein each frame assembly of the plurality of frame assemblies comprises a proximal portion directly coupled to the central body and a distal portion coupled to a cross bar.

4. The vehicle of claim 1, wherein the plurality of frame assemblies are configured to move between a first configuration where the plurality of propulsion units is positioned below the central body and a second configuration where the plurality of propulsion units is positioned above the central body.

5. The vehicle of claim 1, wherein the actuation assembly is configured to actuate the plurality of frame assemblies to a plurality of different vertical angles relative to the central body.

6. The vehicle of claim 1, further comprising a receiver configured to receive user commands for controlling the aerial vehicle.

7. An aerial vehicle comprising:
   a central body;
   a plurality of frame assemblies coupled to the central body;
   an actuation assembly comprising a linear actuator, wherein each frame assembly of the plurality of frame assemblies comprises a portion coupled to the linear actuator, wherein the actuation assembly is configured to transform the plurality of frame assemblies between a first configuration and a second configuration, and wherein the first configuration permits the plurality of frame assemblies to support the aerial vehicle resting on a surface; and
   a plurality of propulsion units mounted on the plurality of frame assemblies and operable to move the aerial vehicle,
   wherein a linear motion of the linear actuator is substantially parallel to a yaw axis of the aerial vehicle.

8. The vehicle of claim 7, wherein the aerial vehicle is an unmanned aerial vehicle.

9. The vehicle of claim 7, wherein each frame assembly of the plurality of frame assemblies comprises a proximal portion directly coupled to the central body and a distal portion coupled to a cross bar.

10. The vehicle of claim 7, wherein the first configuration includes the plurality of propulsion units being positioned below the central body and the second configuration includes the plurality of propulsion units being positioned above the central body.

11. The vehicle of claim 7, further comprising a receiver configured to receive user commands for controlling the aerial vehicle.

12. The vehicle of claim 7, wherein the actuation assembly is configured to transform the plurality of frame assemblies into the first configuration during a first phase of operation of the aerial vehicle and into the second configuration during a second phase of operation of the aerial vehicle.

13. The vehicle of claim 12, wherein the first phase of operation comprises one or more of the aerial vehicle taking off from a surface or landing on the surface, and the second phase of operation comprises the aerial vehicle flying in air.

14. The vehicle of claim 7, wherein the linear motion of the linear actuator remains substantially parallel to the yaw axis of the aerial vehicle when the plurality of frame assemblies are at the first configuration and the second configuration.

15. The vehicle of claim 1, wherein the linear motion of the linear actuator remains substantially parallel to the yaw axis of the aerial vehicle when the plurality of frame assemblies are at the plurality of different angles.

16. An aerial vehicle comprising:
   a central body coupled to a payload;
   a plurality of frame assemblies coupled to the central body;
   an actuation assembly comprising a linear actuator, wherein each frame assembly of the plurality of frame assemblies comprises a portion coupled to the linear actuator, wherein the actuation assembly is configured to transform the plurality of frame assemblies between a first configuration and a second configuration, and wherein the second configuration increases a functional space of the payload; and
   a plurality of propulsion units mounted on the plurality of frame assemblies and operable to move the aerial vehicle,
   wherein a linear motion of the linear actuator is substantially parallel to a yaw axis of the aerial vehicle.

17. The vehicle of claim 16, wherein the aerial vehicle is an unmanned aerial vehicle.

18. The vehicle of claim 16, wherein each frame assembly of the plurality of frame assemblies comprises a proximal portion directly coupled to the central body and a distal portion coupled to a cross bar.

19. The vehicle of claim 16, wherein the actuation assembly is configured to transform the plurality of frame assemblies into the first configuration during a first phase of operation of the aerial vehicle and into the second configuration during a second phase of operation of the aerial vehicle.

20. The vehicle of claim 16, wherein the first phase of operation comprises one or more of the aerial vehicle taking off from a surface or landing on the surface, and the second phase of operation comprises the aerial vehicle flying in air.

21. The vehicle of claim 16, wherein the payload comprises an image capturing device, and the functional space comprises an unobstructed field of view of the image capturing device.

22. The vehicle of claim 16, wherein each frame assembly of the plurality of frame assemblies comprises a support member configured to support the aerial vehicle resting on a surface.

23. The vehicle of claim 16, wherein the linear motion of the linear actuator remains substantially parallel to the yaw axis of the aerial vehicle when the plurality of frame assemblies are at the first configuration and the second configuration.

* * * * *